May 18, 1965  F. M. FLYNN  3,183,753
FILM FEEDER AND CUTTER
Original Filed Nov. 21, 1958  10 Sheets-Sheet 1
FIG. 1.
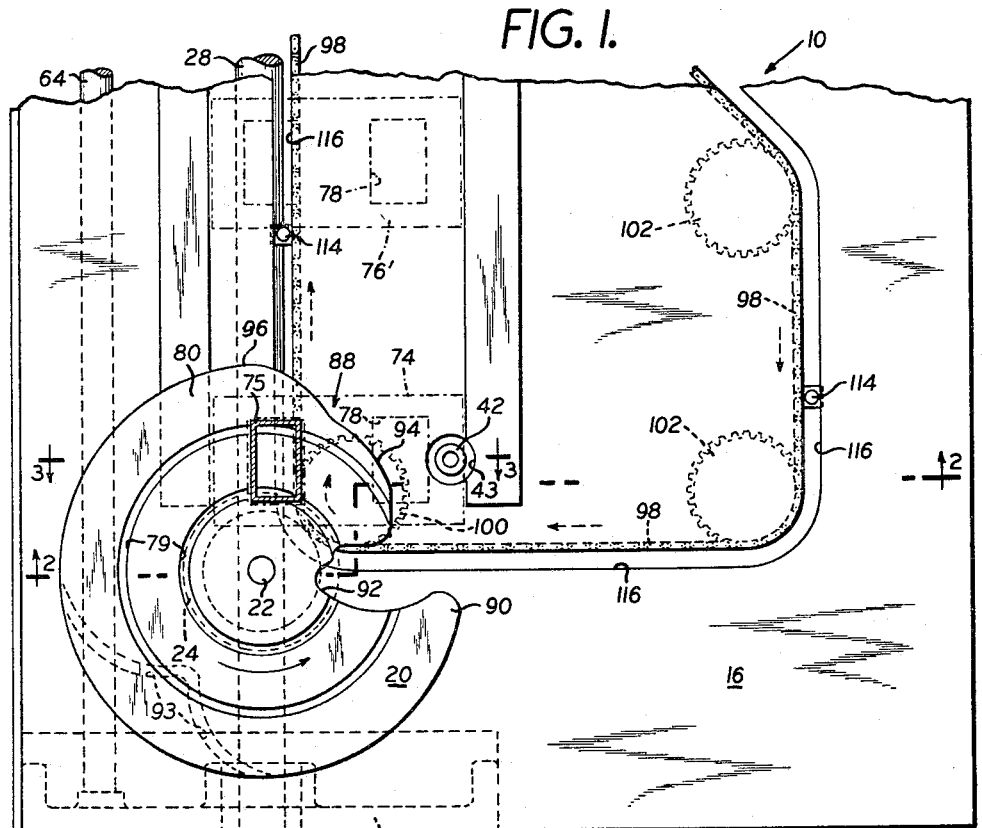
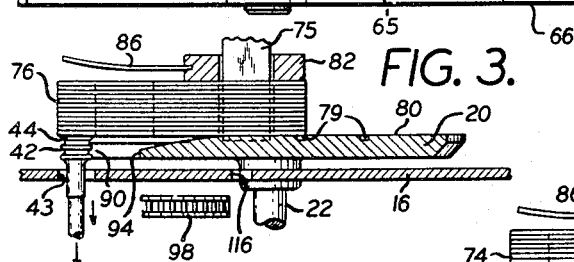
FIG. 3.
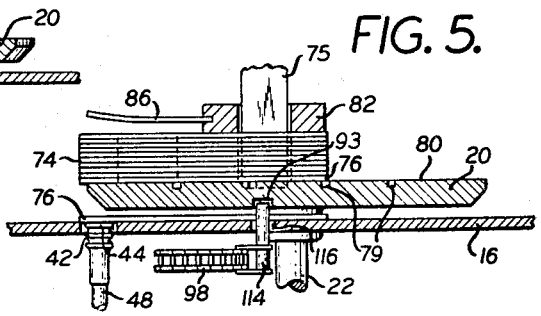
FIG. 5.
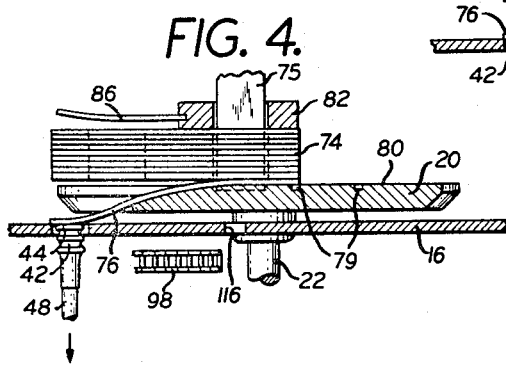
FIG. 4.
INVENTOR
FRANK M. FLYNN
BY
Hubbell, Cohen + Stiefel
ATTORNEYS.

May 18, 1965 F. M. FLYNN 3,183,753
FILM FEEDER AND CUTTER
Original Filed Nov. 21, 1958 10 Sheets-Sheet 2
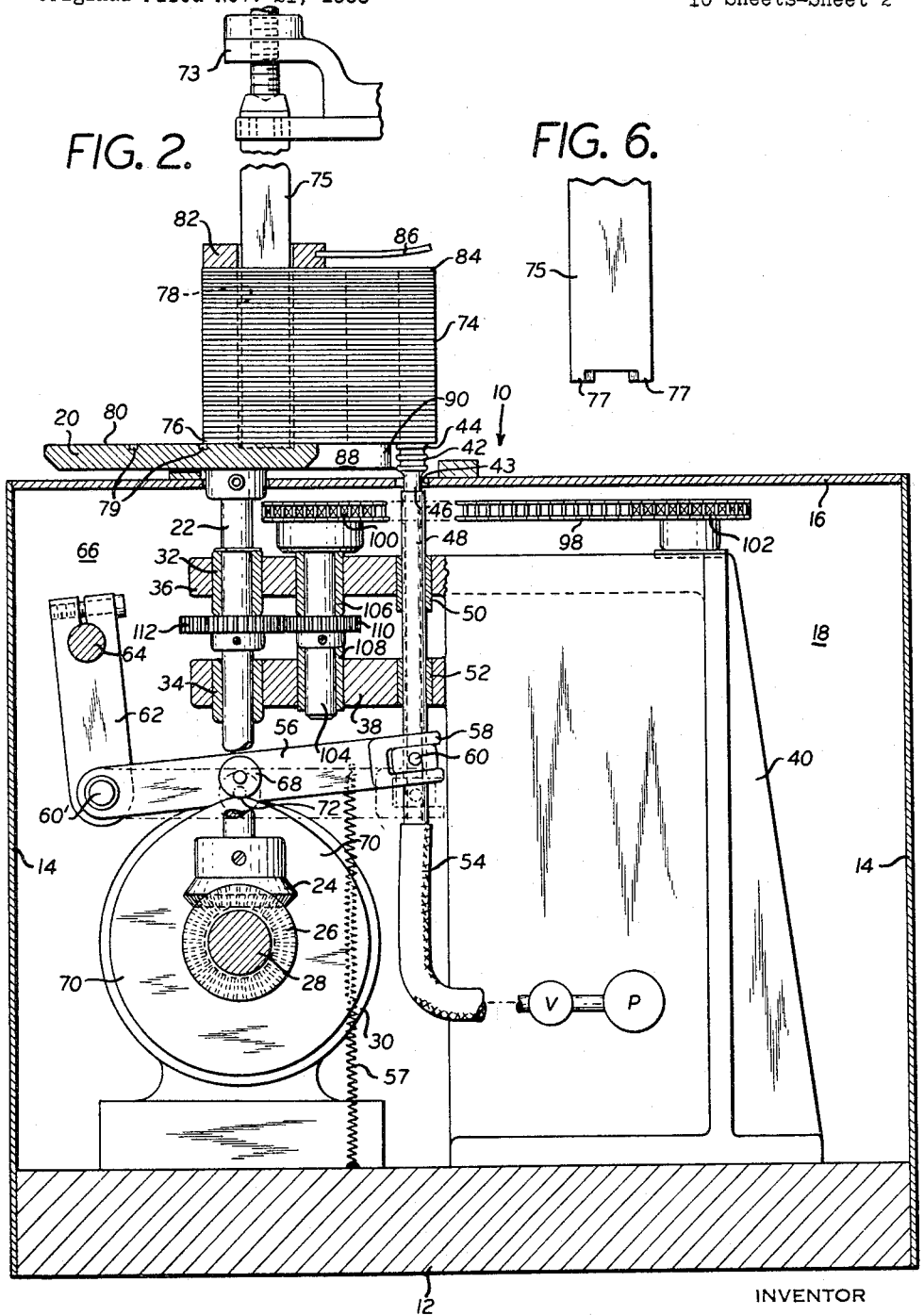
INVENTOR
FRANK M. FLYNN
BY
Hubbell, Cohen & Stiefel
ATTORNEYS.

May 18, 1965   F. M. FLYNN   3,183,753
FILM FEEDER AND CUTTER
Original Filed Nov. 21, 1958   10 Sheets-Sheet 3
FIG. 7.
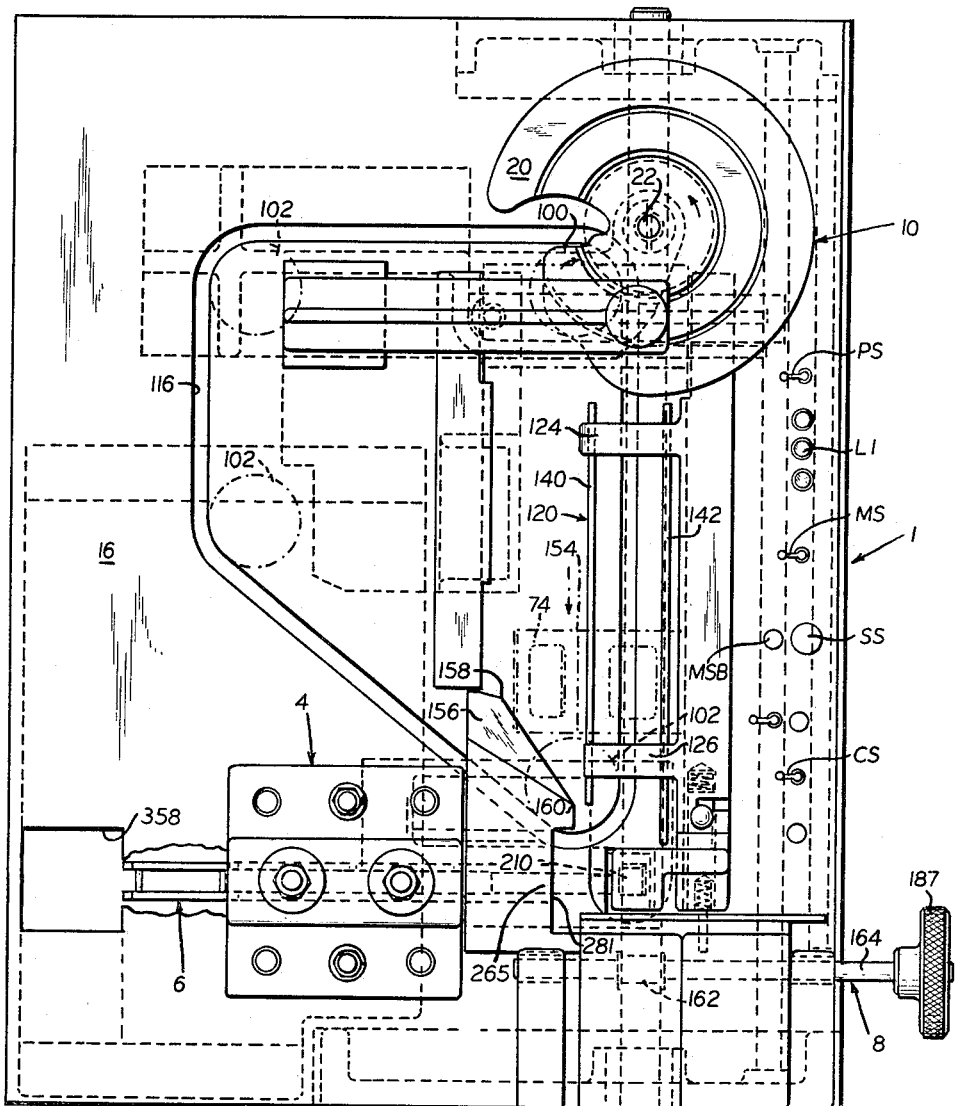
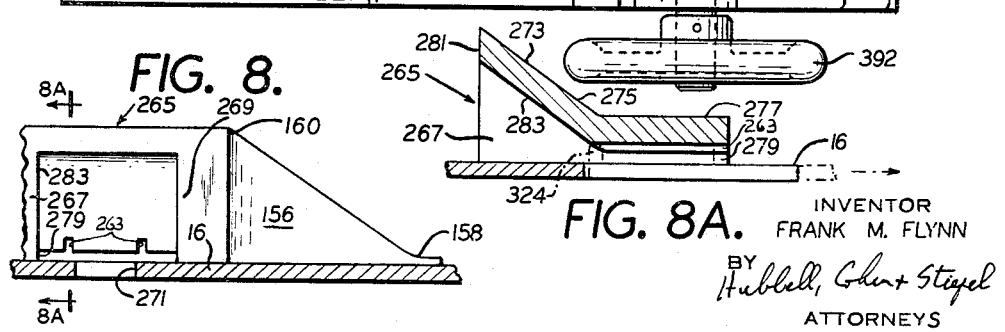
FIG. 8.   FIG. 8A.
INVENTOR
FRANK M. FLYNN
BY
Hubbell, Cohen & Stiefel
ATTORNEYS

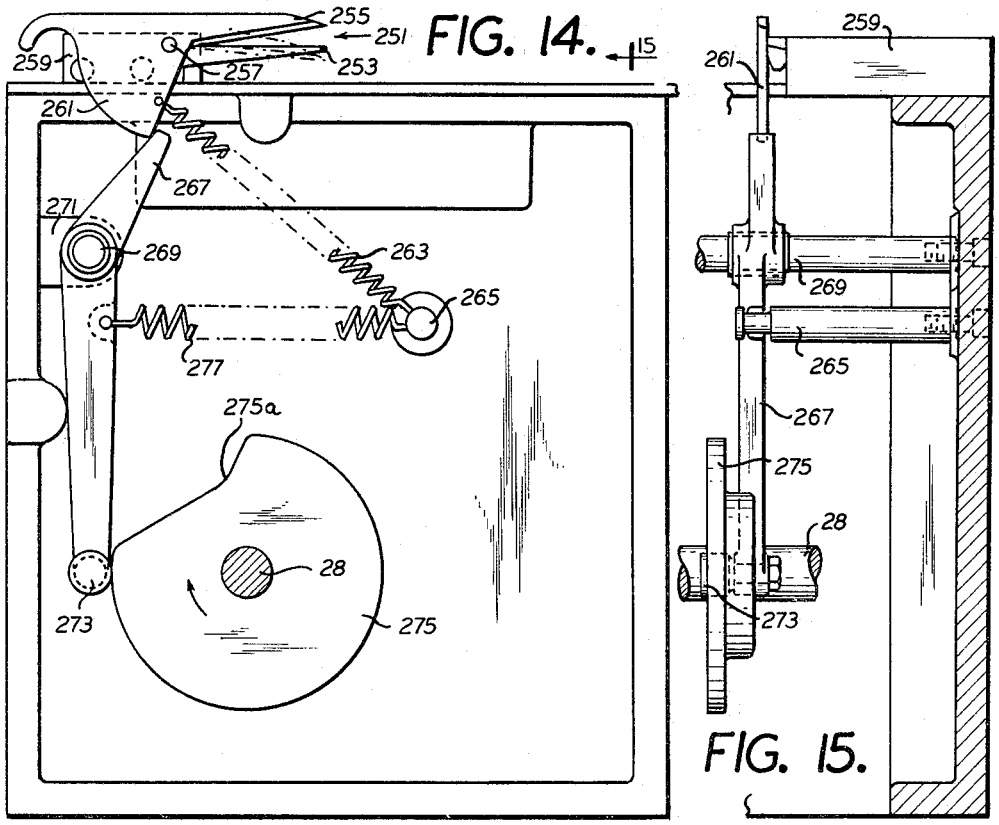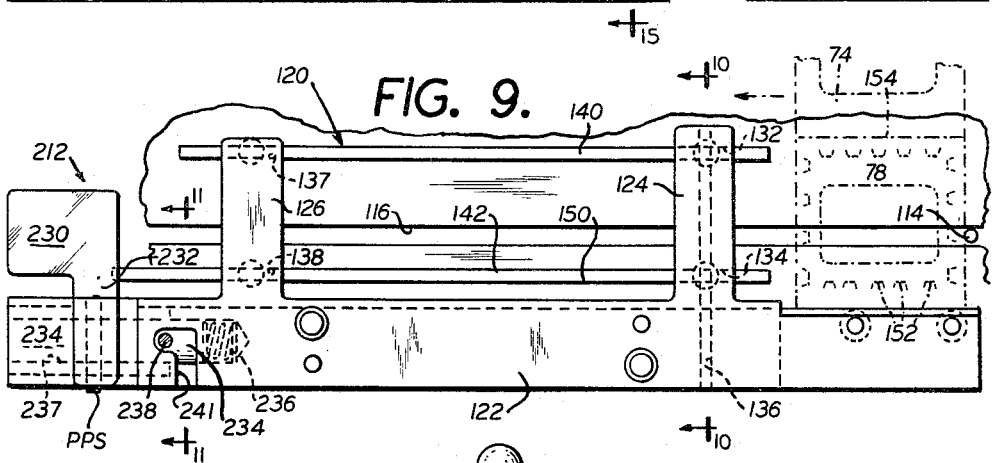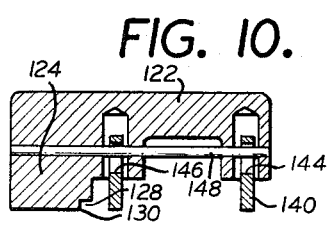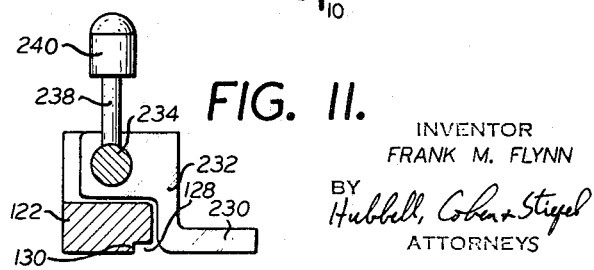

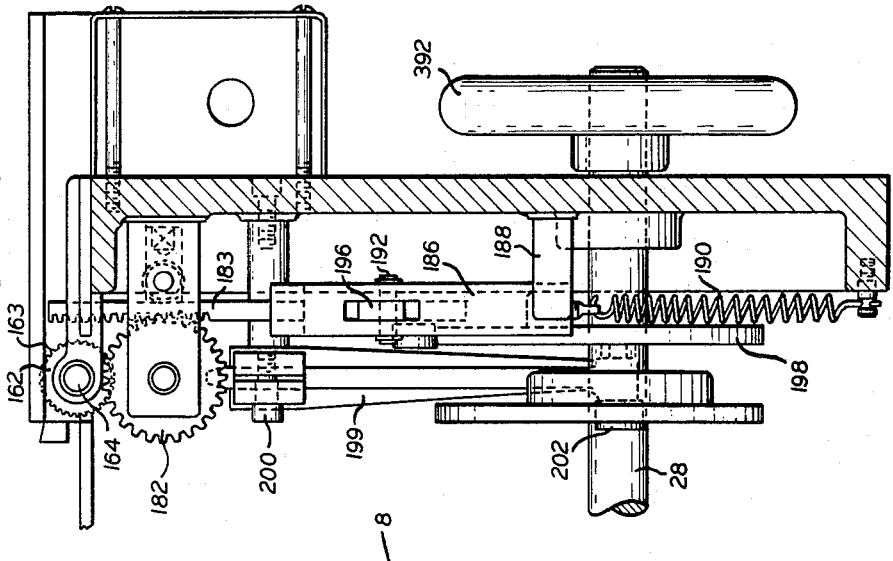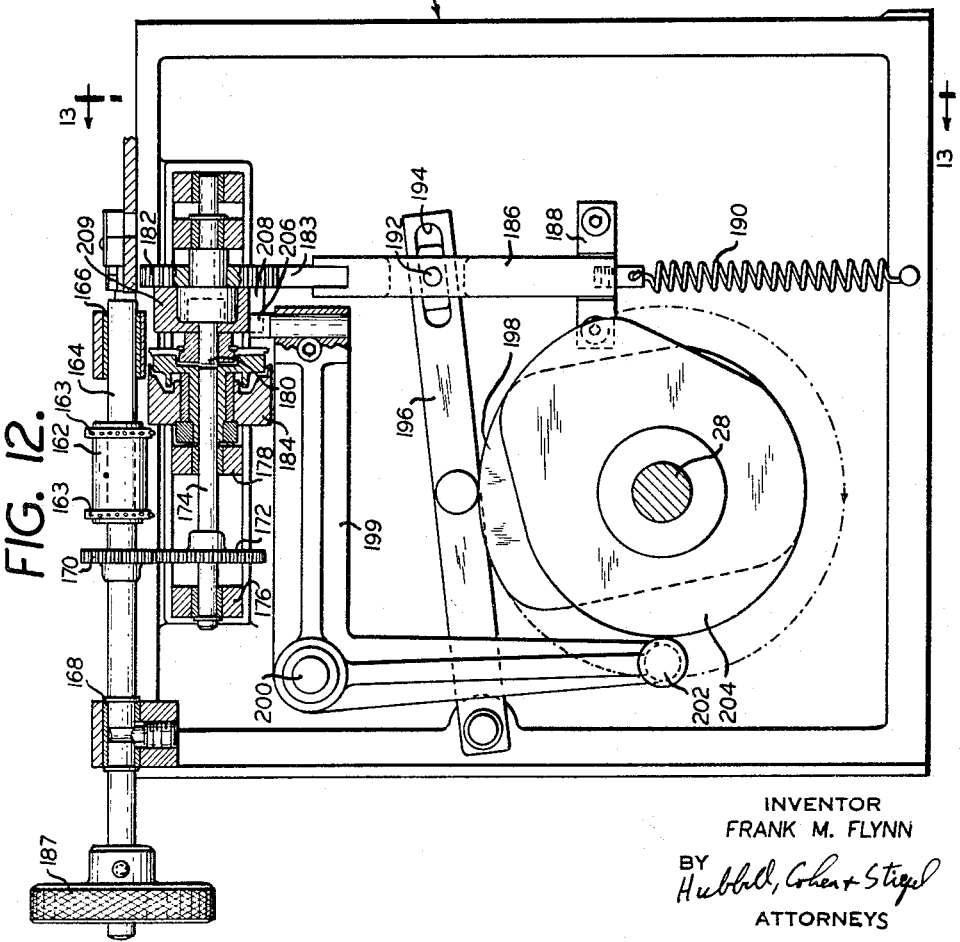

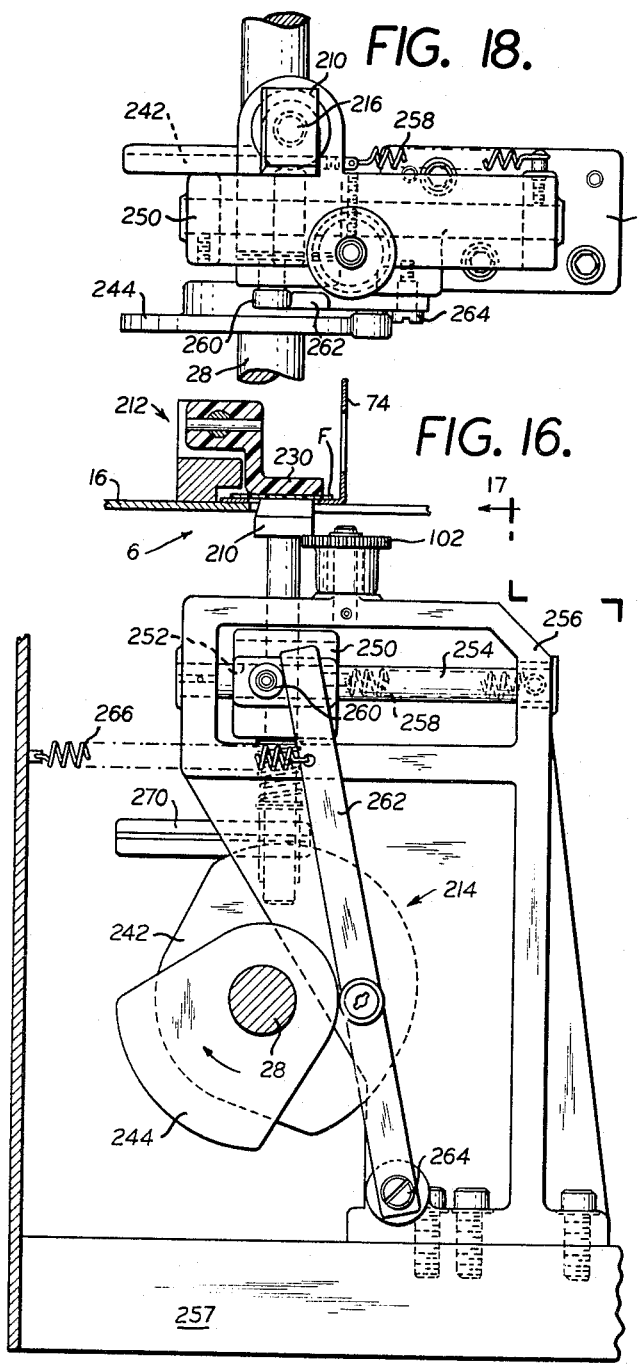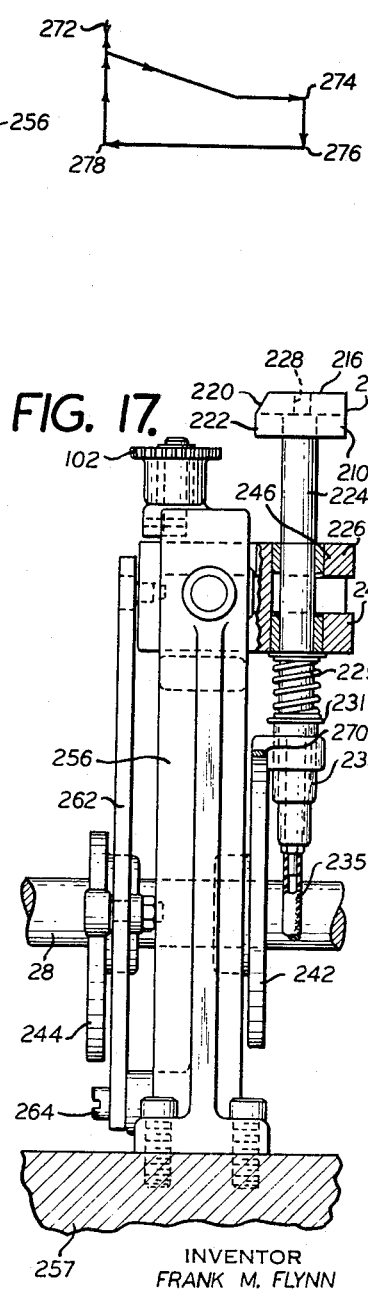

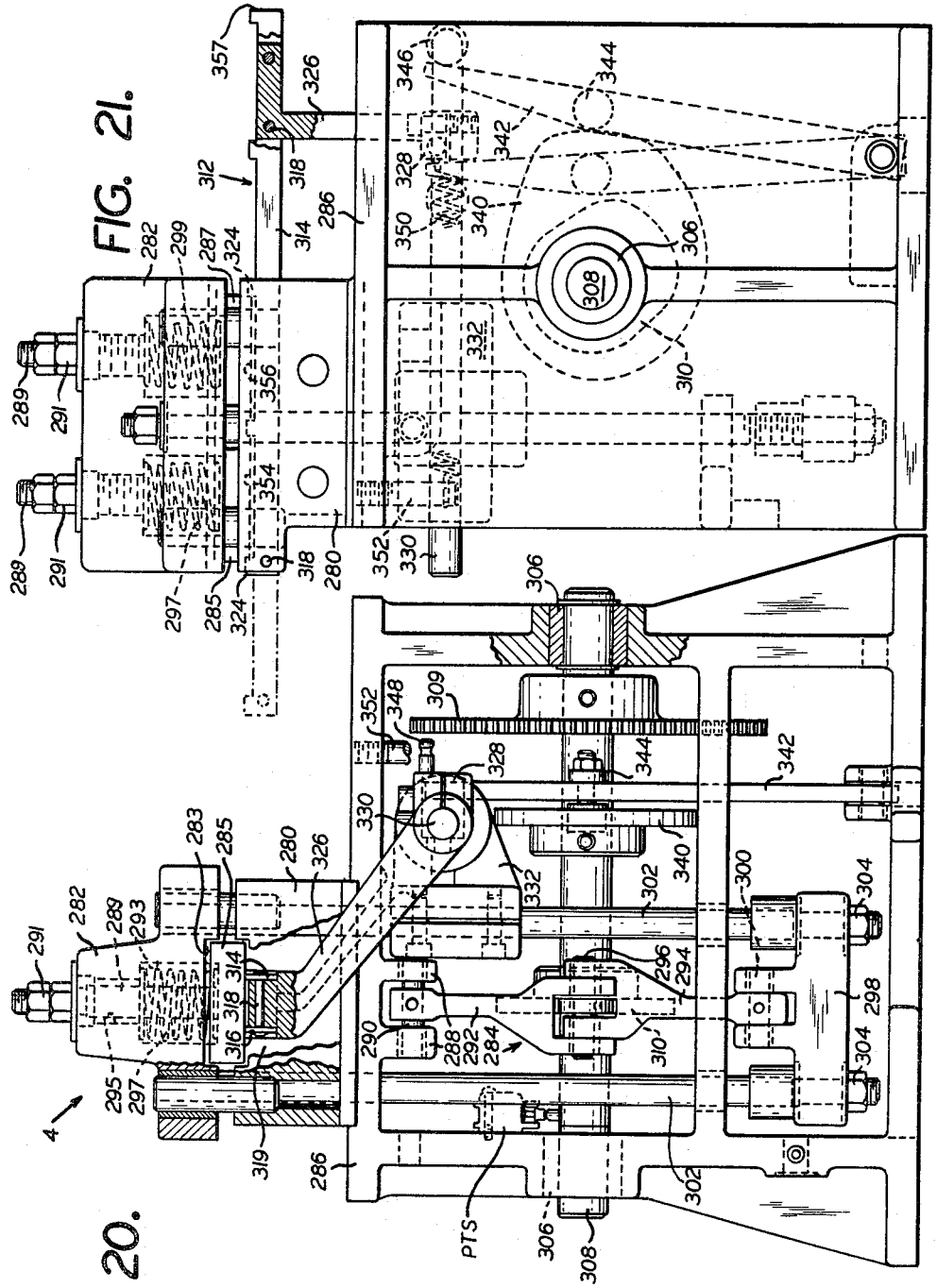

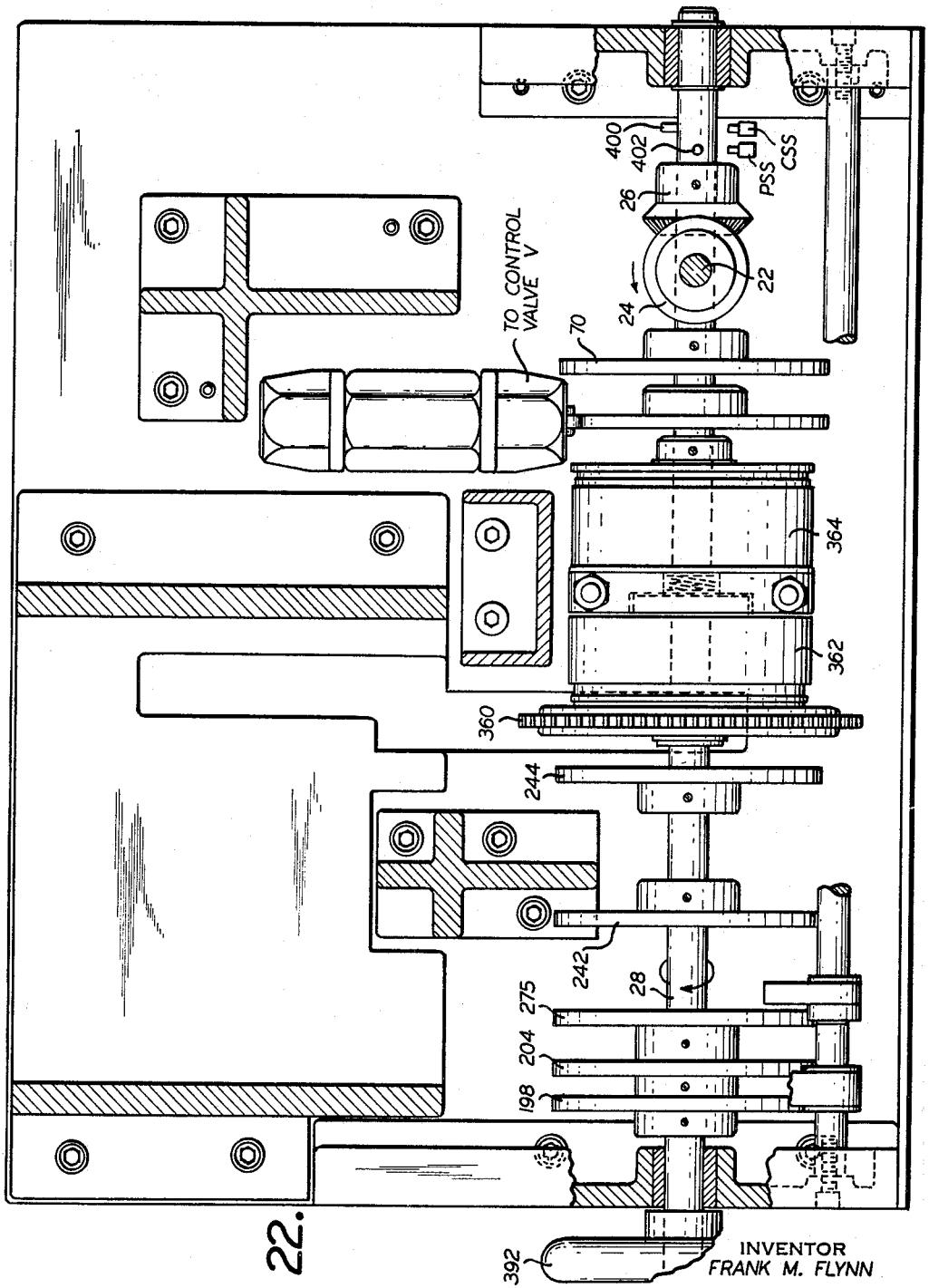

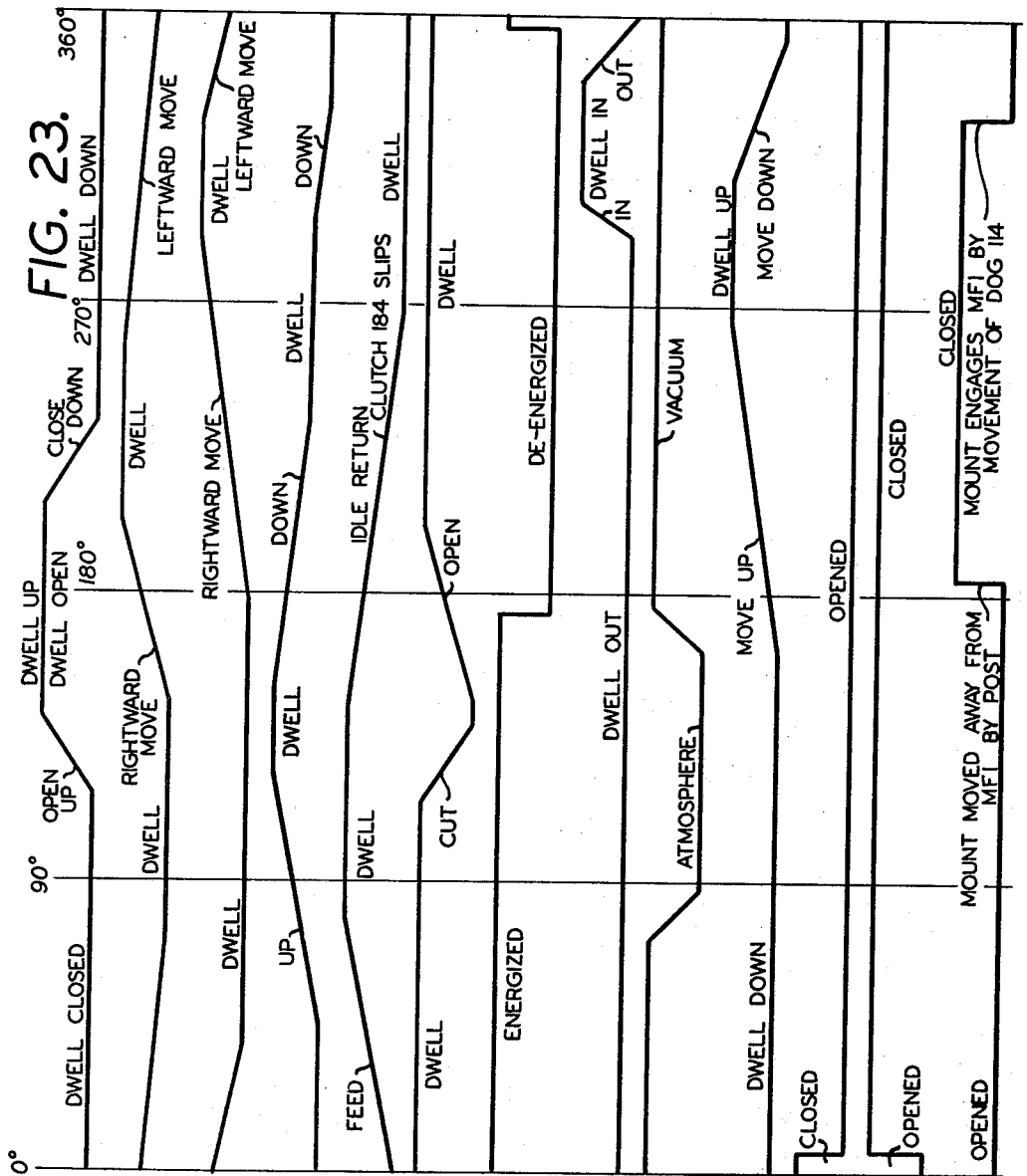

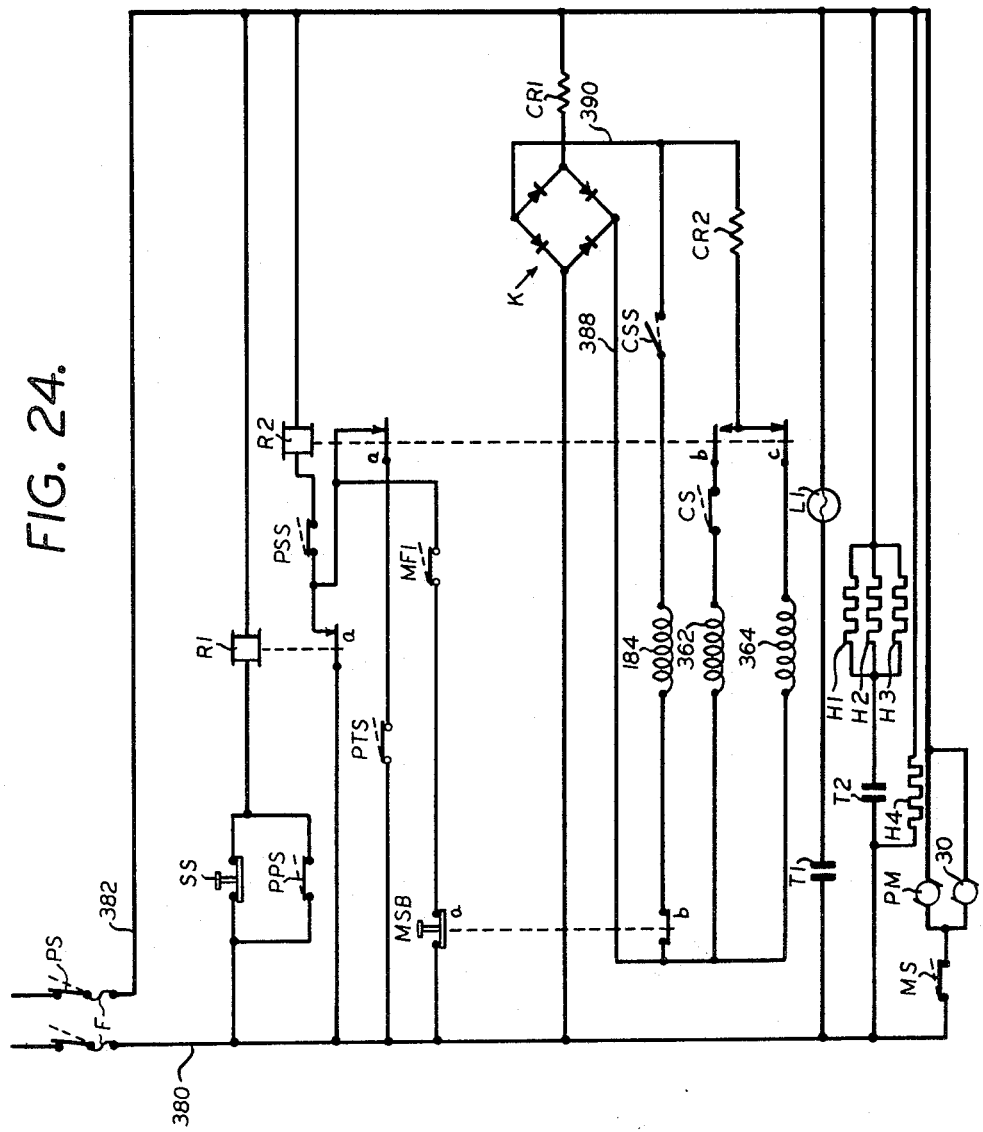

United States Patent Office 3,183,753
Patented May 18, 1965

3,183,753
FILM FEEDER AND CUTTER
Frank M. Flynn, Binghamton, N.Y., assignor to Seary Manufacturing Company, Endicott, N.Y., a partnership
Original application Nov. 21, 1958, Ser. No. 775,412, now Patent No. 3,067,805, dated Dec. 11, 1962. Divided and this application June 5, 1962, Ser. No. 200,253
2 Claims. (Cl. 83—231)

This invention relates to means and a method for mounting photographic transparencies in paper transparency mounts.

Recent years have seen a tremendous growth in interest in color photography and particularly in color transparency photography. The transparency developed from a roll of film taken by a photographer are generally placed within photomounts to provide for easy handling of the transparencies and also for disposition within transparency viewers and transparency slide machines. One suitable mount which has been employed widely for mounting transparencies is described and claimed in U.S. Patent No. 2,495,142, granted to Eugene G. Seary, January 17, 1950, and assigned to the assignee hereof. Heretofore transparencies have been mounted in transparency mounts of the Seary type and other types by hand. However, with the large increase in the volume of transparencies to be mounted the labor employed has become great and has been a substantial item in the cost of mounting transparencies.

The main object of the present invention is the provision of a new and improved machine for automatically mounting transparencies in transparency mounts.

Another object of the present invention is the provision of a new and improved method for mounting transparencies in transparency mounts.

Still another object of the present invention is the provision of a new and improved automatic machine for mounting transparencies in transparency mounts, which machine has a novel means for feeding transparency mounts towards the film and for feeding the film toward the transparency mounts and for folding the transparency mounts over and thereafter sealing them.

The above and other objects, characteristics and features of the present invention will be more fully understood from the following description taken in connection with the accompanying illustrative drawings.

In the drawings:

FIG. 1 is a plan view of a portion of the automatic machine for disposing transparencies in transparency mounts, which portion is effective for separating a transparency mount from a stack thereof;

FIG. 2 is a vertical sectional view taken along the line 2—2 of FIG. 1;

FIG. 3 is a sectional view taken along the line 3—3 of FIG. 1, showing the separating apparatus in one condition during the separating action;

FIG. 4 is a sectional view similar to FIG. 3 showing the apparatus in which the bottommost transparency mount has been partially separated from a vertical stack of similar transparency mounts;

FIG. 5 is a sectional view similar to FIG. 3 showing condition of the separating apparatus when the bottommost transparency mount has been completely separated from the stack;

FIG. 6 is a side elevational view of the lower portion of the bar which aligns transparency mounts in a vertical stack;

FIG. 7 is a plan view of a machine for automatically mounting transparencies in transparency mounts;

FIG. 8 is a side elevational view of a member which folds the transparency mounts;

FIG. 8A is a sectional view taken along the line 8a—8a of FIG. 8A.

FIG. 9 is a plan view on a large scale showing some details of the means for guiding a transparency mount from a position under the stack of mounts to a position where film can be fed to it;

FIG. 10 is a sectional view taken along the line 10—10 in FIG. 9;

FIG. 11 is a sectional view taken along the line 11—11 in FIG. 9;

FIG. 12 is a top plan view of apparatus for feeding a strip of transparency film into the machine with the top cover plate of the machine removed to more clearly illustrate the components of this portion of the machine;

FIG. 13 is a sectional view along the line 13—13 in FIG. 12;

FIG. 14 is a side elevational view of means for cutting off transparencies from a roll of transparency film;

FIG. 15 is a sectional view taken along the line 15—15 of FIG. 14;

FIG. 16 is a view partly in section and partly in elevation of means for moving a transparency mount and a transparency toward a heated press;

FIG. 17 is a sectional view taken along the line 17—17 in FIG. 16;

FIG. 18 is a top plan view of the apparatus shown in FIGS. 16 and 17;

FIG. 19 is a schematic diagram tracing the path of movement of a part of the apparatus shown in FIGS. 16–18;

FIG. 20 is an end elevational view of a press for sealing a transparency in a transparency mount;

FIG. 21 is a side elevational view of the press shown in FIG. 20;

FIG. 22 is a detailed view partly in section and partly in elevation showing the cam shaft for timing the operations of the machine;

FIG. 23 is a diagram showing the relationship of the movement of the several parts of the machine; and FIG. 24 is a circuit diagram of the electrical control apparatus for the machine.

Referring now to the drawings in detail, the apparatus for automatically mounting transparencies in transparency mounts is generally designated by the reference numeral 1. This apparatus includes a device for separating individual transparency mounts from a stack which device is generally designated by the reference numeral 10 (see FIGS. 1 through 6). Also included in apparatus 1 is a device for automatically feeding film to a transparency mount and for positioning that film properly in the mount. This device is generally designated by the reference numeral 8. Apparatus 1 further includes means for moving a transparency mount with a transparency positioned therein away from the film feed device 8, and toward a heated press generally designated by the reference numeral 4. This moving apparatus is generally designated by the reference numeral 6 (see FIGS. 16 to 19). The press 4 is adapted to compress a folded transparency mount and heat it so as to cause the glued surfaces thereof to adhere to one another and thus seal the transparency within the transparency mount (see FIGS. 20 and 21).

As stated above, one suitable transparency mount for use in my machine is the transparency mount described and claimed in the aforementioned U. S. Patent No. 2,495,142. Such transparency mount is made out of a paper blank having a central transverse fold line and apertures on both sides of the said fold line which are adapted to be in registry when the transparency mount is folded along the fold line. Surrounding the aperture on one side of the fold line is an indexing means which has been embossed thereon as by punching and the surfaces of the transparency mount which are adapted to abut against one another when the mount is folded along the fold line are provided with an adhesive which is adapted to adhere to itself upon heating. Of course, other types of transparency mounts may be employed when practicing the present invention.

Referring now to FIGS. 1 through 6 in detail, the automatic device 10 for separating individual transparencies from a stack is illustrated. This device comprises a base 12, vertical side walls 14 and a horizontal supporting surface 16 which between them define a chamber 18 in which various apparatus is disposed. Disposed above the top horizontal supporting surface 16 is a rotating disc 20 which is fixed to a vertical shaft 22 which carries a bevel gear 26 carried by a cam shaft 28 driven by a motor 30. Motor 30 is here shown fixed to base 12. Shaft 22 is journaled in two spaced bearings 32 and 34 which are carried by horizontal bearing supports 36 and 38, respectively. Bearing supports 36 and 38 are in turn supported by a vertical structure 40. As shown herein, the two bearing support surfaces 36 and 38 are integrally formed with the structure 40 and the latter is in turn fixed to and supported by the base 12.

A suction device 42 is employed for grasping individual transparency mounts and for initially partially separating them from a stack. As shown herein, suction device 42 is in the form of a bellows which extends upwardly through surface 16 through an opening 43. This form of suction device is described and claimed in my co-pending U.S. patent application, Serial No. 689,434, filed by me on October 10, 1957, now abandoned, and assigned to the assignee hereof. As described in my aforementioned application, bellows 42 is collapsible in the vertical direction but is resistant to collapse in the horizontal direction. Accordingly, when the upper edge 44 of bellows 42 is in sealed engagement with the planar surface of a transparency mount and negative pressure is supplied to the bellows through its opposite end 46 as will be described hereinafter, bellows 42 will collapse in the longitudinal or vertical direction but will resist collapse in the transverse or horizontal direction. Horizontal collapse would result in a cutting off of the negative pressure applied to the end 44 which in turn would result in a releasing of the engaged transparency mount. Moreover, for reasons to be pointed out hereinafter, bellows 42 is bendable away from its normal longitudinal axis. If a more detailed description of the suction device is desired, reference may be had to my aforementioned application. Suction device 42 is connected to a tube 48 which is slidably mounted in bearings 50 and 52 carried by bearing supports 36 and 38 respectively. The lower end of tube 48 is connected to a flexible hose 54 which is adapted to be connected to a negative pressure device, such as an exhaust pump P, preferably through an intermittently operable valve V. As was described hereinbefore, when negative pressure is applied to bellows 42 with the upper edge of the bellows in sealed relation with a transparency mount, the bellows will collapse in a vertical direction thereby imparting vertical movement to the upper end 44. While for some applications the vertical movement resulting from the vertical collapse of the bellows 42 will suffice to effect a partial separation of a transparency mount from a stack, in the present invention it is preferred to supply additional vertical movement to said stack. This adidtional movement is supplied by a reciprocating lever 56 which is connected to a tube 48 by means of a sleeve 58 which surrounds a pin 60 connected to tube 48. Lever 56 is pivotally mounted as at 60 on a link 62 which is in turn further pivotally mounted on a stud 64 carried by fixtures 65 supported by base 12 and side walls 66 of the bottom enclosure. A spring 57 connected to lever 56 biases a cam follower 68 which is rotatably mounted on lever 56 into engagement with a cam 70 carried by the output shaft 28 of motor 30. Cam 70 is substantially circular but has a high point 72 which for a short time during a complete revolution of the cam moves the lever 56 upwardly to thereby in turn move the tube 48 upwardly; and after a short time the high point 72 moves out of engagement with the cam follower 68 to permit the dropping of described elements. As will be shown hereinafter, the vertical reciprocating movement of the bellows 42 is in timed relation with the rotation of disc 20.

Supported by the upper surface of the disc 20 is a stack of transparency mounts 74 of the type hereinbefore described. To maintain the stack in vertical alignment, a rectangular bar 75 extends vertically down through one of the rectangular apertures 78 of the stack of transparency mounts. Bar 75 is preferably releasably held adjacent the top thereof in any suitable manner as by clamp 73, and is accurately indexed relative to disc 20 by any suitable means such as index pins 77 and slots 81. This insures for proper positioning of the stack relative to disc 20 and bellows 42. To bias the stack downwardly so that the bottommost mount 76 is resting on the upper surface 80 of the disc 20, a weight 82 having an aperture slightly larger than the cross section of bar 75 surrounds said bar and bears against the uppermost mount 84 of the stack. Weight 82 preferably carries a spring 86 which extends outwardly from the weight and is adapted to limit the upward movement of the uppermost mount 84 to insure engagement of bellows 42 with the lowermost mount 76. In operation, spring 86 will not engage the uppermost mount 84 when the stack is of substantial size as the weight of the stack will be sufficient to resist the upward force exerted against the lowermost mount 76. Moreover, with a substantial stack if the spring did engage the uppermost mount 84 with any sizable force, it might well cause more than one mount to be separated from the stack at a given time. However, when the stack is substantially depleted so that there is not sufficient weight bearing on the lowermost mount 76 to resist the upward force exerted against the stack by the bellows as it moves into engaging relation with the lowermost mount 76, the stack will tend to move up and this upward movement is limited by spring 86 to insure that the lowermost mount will be held in a position where a seal can be effected between the bellows and the lowermost mount 76.

Bar 75 is preferably tapered at the top as shown in FIG. 2, in order to facilitate easy insertion of the bar through the rectangular apertures 78 in the stack of transparency mounts 74. Moreover, the bottom of bar 75 is provided with two vertical extensions 77 which are adapted to fit into two spaced annular grooves 79 in the upper surface 80 of disc 20 so as to prevent the lowermost mount 76 from dragging out from under the stack by the rotation of disc 20. Moreover, if desired, bar 75 may be supported by disc 20 to facilitate loading of photomounts without the removal of the bar from the machine. If such a construction were employed, bar 75 could be conditioned for loading merely by unclamping clamp 73. However, as shown, bar 75 must be removed in order to load photomounts thereon.

Disc 20 is of a particular peripheral configuration. Essentially, the disc 20 is circular but is provided with a cut-out portion 88 in the periphery thereof. This cutout portion is shaped so that there is a finger 90 extending in the direction of rotation by the disc 20. Immediately adjacent finger 90 is a deep cut-out portion 92. The cutout portion 92 is of relatively small peripheral extent and immediately adjacent thereto is a long relatively shallow cut-out portion 94 which extends between the deep cut-out portion 92 and the trailing end 96 of the circular periphery of the disc. The upper surface 80 slopes downwardly as it approaches the periphery of shallow cut-out portion 94. The purpose of this sloping surface contour will become clear as this description progresses. As will be shown hereinafter, vertical movement of the bellows 42 is in such timed relation with rotation of the disc 20 that the upper edge 44 of the bellows 42 is disposed above the upper surface of the disc 20 only when the shallow cut-out portion 94 registers with the bellows. At other times, the upper edge 44 of the bellows 42 is disposed below the lower surface of the disc 20, and, in fact, the disc overlies at least a portion of said bellows at times when the circular periphery of the disc 20 is in registry with the bellows.

The operation of the mount separating mechanism 10 described above is as follows: The initial condition is shown in FIG. 3. In this condition disc 20 is supporting substantially the entire lower surface of the bottommost transparency mount 76. The bellows 42 is in its extended condition with the upper edge 44 disposed in engagement with the bottom surface of the lowermost mount 76. This disposition of the bellows 42 is a result of the fact that cam follower 68 is in engagement with the raised portion 72 of the cam 70 and valve V is closed to cut off the supply of negative pressure to the bellows. Due to the flexibility of bellows 42, upper edge 44 will align itself in sealing relation with the lower surface of the lowest transparency mount. At this point valve V is opened to supply negative pressure to the bellows 42 through the flexible hose 54 and tube 48 to complete the seal between the upper edge 44 of the bellows and the lower surface of the lowest transparency mount 76. Moreover the negative pressure will cause the vertical collapse of bellows 42 to thus move the left hand portion of mount 76 downward as viewed in FIGS. 3 to 5. Rotation of shaft 28 naturally is continuous and after a brief interval during which the aforementioned seal is effected, raised portion 72 of cam 70 will move out of engagement with cam follower 68 which will permit lever 56 to move downwardly under the urging of spring 57. This downward movement will complete the movement of bellows 42 downwardly to the position shown in FIG. 4. Since there is a sealing rotation between the upper edge 44 of bellows 42 and the bottommost transparency mount 76, the end of the transparency mount which is in engagement with the upper edge 44 of the bellows will move downwardly with said upper edge as shown in FIG. 4. This will dispose the left hand edge of the transparency mount as viewed in FIG. 4 in a plane below the lower surface of disc 20 to thereby partially separate mount 76 from the stack 74. With the apparatus in this condition, the left hand portion of mount 76 overlies the tapered upper surface portion of disc 20, and the extreme left hand end rests on surface 16. If the tapered surface were not provided, it would be practically impossible to achieve the partially separated condition shown in FIG. 4 as the mount 76 would be irreparably damaged if it were bent around an untapered surface. Moreover, the shallow cut-out portion 94 provides access for the left hand end of photomount 76 to supporting surface 16 to enable the left hand end of said mount as viewed in FIG. 4 to engage said surface 16 when drawn downwardly by bellows 42. At this point finger 90 of disc 20 moves between the left hand end of mount 76 and the left hand end of the mount immediately thereabove as viewed in FIG. 4.

Continued rotation of the disc 20 in a counterclockwise direction as viewed in FIG. 1 moves the finger 90 and the portions of disc 20 immediately therebehind between mount 76 and the mount immediately thereabove. This movement will effect a peeling of the lowest mount 76 off of the stack until finally all of the disc 20 moves out of supporting relation with the entire surface of lowest mount 76 to permit it to drop or snap against the supporting surface 16. However, at the time that this dropping or snapping occurs, disc 20 will be in supporting relation with the mount immediately above mount 76 which now becomes the new lowermost mount in the stack. This condition is illustrated in FIG. 5. It is to be noted that the disc 20 moves out of supporting relation with the lowermost mount 76 at the point when the deep cut 92 registers with the lower left hand corner of the mount stack 74 as viewed in FIG. 1. Thereafter, disc 20 continues rotating in supporting relation with the new lowermost mount until cut-out portion 94 again moves into registry with bellows 42 at which point the cycle is repeated. Intermittently operable valve V is again closed after complete separation of mount 76 is effected so as to break the seal between the bellows and the separated mount to free said mount for movement transversely of the stack out from under the stack.

It will be noted that as the bottommost photomount 76 is peeled away from the stack by disc 20, the portion thereof which is in sealing relation with the top 44 of bellows 42 passes through a number of different poses in which the portion is oriented at varying angles to the horizontal. Such movement of mount 76 might well break the seal between the mount and bellows. However, as was pointed out hereinbefore, bellows 42 is deformable or bendable away from its longitudinal (vertical) axis. Accordingly, as the portion of mount 76 in engagement with bellows 42 moves into different angular relations with the horizontal, bellows 42 bends in order to keep the edge 44 coplanar with the engaged portion of mount 76. This obviates the possibility of the seal between the bellows and the mount being broken and assures a proper removal of the mount as has been described hereinbefore.

To move each photomount which has been peeled off of the stack by the disc 20 out from under the disc and the stack a continuous or endless chain 98 having a plurality of studs 114 connected thereto is employed. As here shown, three studs 114 are connected with the chain. Chain 98 is disposed in a horizontal plane under top surpace 16 of apparatus 1 and around three idler sprockets 102 which are so disposed as to cause the chain to move in a trapezoidal path. Drive sprocket 100 is mounted on a vertical shaft 104 which is journaled in bearings 106 and 108 which in turn are carried by bearing supports 36 and 28, respectively. Fixed to shaft 104 is a spur gear 110 which is in meshed relation with a spur gear 112 fixed to the shaft 22. Accordingly, chain 98 moves continuously in timed relation with the rotation of disc 20.

The studs 114 are connected to the chain 98 in such a manner as to extend laterally outwardly from the chain and studs 114 each having a vertically extending portion which extends through a continuous slot 116 in the horizontal supporting surface 16. Slot 116 is trapezoidal and generally follows the path of movement of the chain. Each of the studs 114 extends upwardly above the horizontal support surface 16 sufficiently far to extend above the bottom surface of disc 20. As the dogs 114 move under the disc 20 the lower surface of disc 20 must be provided with a groove to permit the unobstructed passage of the dogs under the disc. This groove is designated by the reference character 93 and is shaped somewhat like a "3" to permit the dogs to follow their right angle path of movement under the disc as the disc rotates. Each of the dogs as it turns the corner around sprocket 100 engages the rear edge of a photomount 74 and thereafter pushes the photomount out from under the disc for further processing. The reason for the dogs extending above the bottom surface of disc 20 is to prevent the possibility of a mount becoming sandwiched in between a dog and the bottom surface of the disc which would result in jamming.

As the photomount 74 moves out from under the disc 20 its moves under a mount hold down device generally designated by the reference numeral 120 (FIG. 9). The mount hold down assembly 120 comprises a longitudinally extending member 122 which is fixed to the upper support plate 16 as by a plurality of screws. Member 122 has integrally formed therewith two transverse arms 124 and 126. Formed along the bottom edge of member 122 is a groove 128 which is adapted to receive and be complementary to the corner of photomount 74. The vertical edge of the groove herein designated as 130 is planar and extends parallel to the path of movement of the photomount 74 as it is being moved by the studs 114 in a direction transverse to the photomount's longitudinal axis or parallel to its transverse fold line. Arm 124 is provided with two spaced parallel grooves 132 and 134 and is further provided with a circular passage or cavity 136 which extends through the entire length of the arm as well as through the member 122, and intersects both of the grooves 132 and 134. Arm 126 is shorter than arm 124 and is provided at its outer edge with a notch 137 which is aligned with slot 132 for reasons which will become clear hereinafter. Arm 126 is also provided with a slot 138 which is in alignment with the slot 134 and parallel to the notch 137. Disposed in slot 132 and notch 137 is a longitudinally extending rail 140 and disposed in slots 134 and 138 is a second longitudinally extending rail 142 which is parallel to and spaced from the rail 140. Rails 140 and 142 are each provided with vertically extending elongated slots 144 and 146, respectively, which slots are adapted to register with the cavity 136. A pin 148 is disposed within the cavity 136 and extends through the slots 144 and 146 in rails 140 and 142, respectively. The slots 144 and 146 have a width which is adapted to receive the pin 148 with little clearance, but the longitudinal extents of the elongated slots 144 and 146 are substantially longer than the diameter of the pin 148. Thus the rails 140 and 142 are free to move in a vertical direction but are prevented from moving horizontally. As shown herein rails 140 and 142 are thus positioned by the slots 132, 134 and 138 as well as the groove 137. They are limited in movement transverse of their longitudinal axes by their slots and notch 136 and they are further limited in movement in a longitudinal direction by the pin 148.

The outer edge 150 of rail 142 is positioned by the slots 134 and 138 so that the outer surface 150 will abut against the inner edges 152 of the embossments on the photomount 74. This abutting relation will prevent any tendency on the part of the photomount 74 to cartwheel or spin as it is moved under the mount hold down mechanism. The rail 140 is disposed close to the fold line 154 of the photomount 74 but on the same side of the fold line as the rail 142.

As a dog 114 moves the photomount 74 in a direction parallel to its fold line 154, the leading edge of the photomount will engage the front edges of the rails 140 and 142 and cause them to lift so as to permit the photomount to move thereunder. The weight of the rails, however, will bear against the upper surface of the photomount and will thus keep it from raising up off the surface 16 of the machine. Moreover, the inter-engagement of track 142 and the embossments 152 will prevent cartwheeling. Thus the photomount 74 may be progressed along the machine away from the stack separating apparatus 10 without fear of it being moved out of a predetermined position necessary for further operation of the photomount.

Disposed adjacent the arm 126 and fixed to the surface 16 is a folding member 156. Folding member 156 is shaped so that it is substantially in the plane of surface 16 at the edge which is first encountered by the photomount 74 and is substantially vertical at the end last encountered by the photomount (see FIGS. 7 and 8). The portions in between are graduated therebetween in a smooth upwardly and inwardly extending surface. Thus as the photomount 74 moves down under the hold down mechanism 120 the front left hand corner 158 of the photomount 74 as viewed in FIG. 7 will engage the substantially flat leading end of the folding member 156 and move over that surface. However, as the photomount 74 progresses down the mount hold down mechanism under the impetus of the dog 114, the surface 156 continues to rise and move in towards the transverse fold line of the photomount. The photomount, however, is unable to shift as it is held in position by the mount hold down mechanism and thus is forced to yield and fold along the central transverse fold line 154. The trailing edge 160 of the folding surface 155 is located so as to register with the central transverse fold line 154 of photomount 74 and thus cause the photomount 74 to be folded at right angles along the transverse fold line 154. In this right angle folded condition the photomount is passed on to the film fed mechanism 8 for having a transparency disposed therein. As this initial folding is accomplished while the photomount is under the hold down mechanism, arm 126 must terminate in substantially the same plane as rail 140 to prevent jamming of the mounts against the arm 126.

Transparencies are generally printed on a single roll of film having perforations along the edges. Each transparency constitutes a single frame on said roll of film and the roll may have hundreds of frames. The roll of transparency film looks much like a reel of motion picture film. The film is mounted on a spool holder (not shown) and is fed to machine 1 by film feed mechanism 8 (FIGS. 12 and 13). The film feed mechanism 8 includes a sprocket 162 mounted on a shaft 164 rotatably journaled in bearings 166 and 168. Sprocket 162 is provided with teeth 163 which are adapted to interengage the film perforations when the film is passed over the sprocket. Fixed to shaft 164 is a spur gear 170 which is in meshed relation with a spur gear 172 fixed to a shaft 174 which is journaled in bearings 176 and 178. Shaft 174 is in alignment with a shaft 180 which has fixed thereon a pinion 182 for rotating shaft 180. To connect a line shaft 174 and 180 a cutter clutch 184 is employed. Cutter clutch 184 as here shown is an electrically operated clutch which is normally energized during operation in order to connect the two shafts 174 and 180 together. However, the cutter clutch can be deenergized to disconnect the shaft 180 from the shaft 174 and thereby free the shaft 174 and the shaft 164 for rotation by manual operation of the handle 187 mounted on the shaft 164. This manual operation is necessary for positioning the first frame on the roll of film before automatic operation of the machine begins. It also provides for indexing in the event that the machine happens to malfunction and move the film so that it will not be properly positioned for insertion in a photomount.

To automatically rotate sprocket 162 when the film is properly positioned for automatic operation, the pinion 182 is engaged by a rack 183 which is fixed to a connecting rod 186 which is slidably mounted in a bracket 188 fixed relative to the base of the machine. Connecting rod 186 is spring biased by a tension spring 190 secured at one end to an end of the connecting rod 186 and secured at its other end to the base of the machine. Fixed to the connecting rod 186 in a central portion thereof is a pin 192 which extends laterally of the connecting rod. Pin 192 extends through an elongated slot 194 in a cam follower 196 which is pivotally connected at its other end to the base of the machine. The cam follower 196 engages a cam 198 which imparts to the cam follower a reciprocating motion. The reciprocating motion of the cam follower 196 is imparted to the connecting rod 186 by the pin and slot connection 192–194. With the connecting rod 186 reciprocating as described above it will be obvious that the rack 183 reciprocates back and forth in synchronism therewith. The reciprocation of rack 183 will cause an oscillating movement to be imparted to pinion 182 and thence to shaft 180. However, the cutter clutch 184 is arranged when energized to impart movement between the two shafts 174 and 180 in only one direction there being slippage in the clutch in the reverse direction. Thus, the sprocket 162 will oscillate periodically in a direction to advance the film one frame for positioning and during the return stroke of the rack 183 the sprocket 162 will be stationary.

Also provided with the film feed mechanism 8 is an indexing means. This means herein constitutes a right angle shaped member 199 pivoted at its center or apex 200 on stationary support structure. One end of the member 199 is provided with a roller 202 which engages a cam 204 which is designed to impart an intermittent oscillating motion to the member 199 as the cam rotates. Secured to the other end of the right angle member 199 is a locking dog 206 which is adapted to fit into a slot 208 in a hub 209 mounted on shaft 180 adjacent pinion 182 and thus hold the shaft in a predetermined position. The cams 198 and 204 are so cut and designed that the locking dog 206 is pivoted out of the slot 208 when rotary motion is imparted to pinion 182 and is moved into the slot 208 when the pinion is stationary. The primary function of the locking dog is accurately indexing the film once per operation of the film feed mechanism to eliminate the possibility of small errors in the distance the film is advanced accumulating, which accumulation might eventually cause the cutting of film to occur on the frame rather than on the margins between frames.

The operation of the film feed mechanism 8 is as follows. A roll of film is mounted on the film holder (not shown) and is manually brought over the sprocket 162 so that the perforations along the side of the film engage the teeth 163 on the sprocket. This is done with the cutter clutch deenergized and at that time the locking dog 206 is disposed in the slot 208 on hub 209. After proper positioning is achieved the main clutch on the drive shaft is energized to cause the cam shaft 28 to commence rotating as will be described hereinafter. The rotation of the cam shaft 28 causes the cam 204 to permit a pivoted movement in a clockwise direction of member 199 to withdraw the locking dog 206 from slot 208. Thereafter the cam 198 causes cam follower 196 to oscillate so as to impart a rotary movement to pinion 182 and hence to shaft 180. At this time the cutter clutch is energized and the rotation of shaft 180 is in such a direction that the clutch will impart a similar movement to shaft 174. The rotation of shaft 174 will impart a rotation of the opposite direction to shaft 164 and hence to member 162 to thus advance the film a predetermined distance equal to one frame length. Thereafter, cam 198 will cause a pivoting movement of the cam follower 196 in the opposite direction to thus rotate pinion 182 in the opposite direction, which rotation will not be imparted to shaft 174 due to the slippage in the cutter clutch. Accordingly, there will be no movement of shaft 164 or member 162. After the rack 183 has completed its return stroke cam 204 will pivot member 198 in a counter-clockwise direction to thereby cause member 206 to again reenter slot 208 which has made one complete revolution and is thereafter adapted to receive the locking dog for a second time to thus index the film. In this way one frame is advanced during each of the described sequence of operations as described above.

Referring now to FIGS. 14 and 15, the means for cutting off an individual frame of film from a roll of film is disclosed. This means includes a scissors 251 through which the film passes. The scissors 251 includes a stationary blade 253 and a movable blade 255, the blade 255 being pivotally mounted as at 257 on an upstanding bracket 259 secured to the frame of the machine. The movable blade 255 has a downwardly extending portion 261 to which is connected one end of a tension spring 263. The other end of the tension spring 263 is connected to a stud 265 mounted on the supporting structure of the machine. The tension spring biases the movable blade 255 to its open or solid line position as viewed in FIG. 13. Engaging the downwardly extending portion 261 of the blade 255 is one arm of a lever 267 which is pivotally mounted as at 269 on an ear 271 which is fixed to the frame of the machine. The other end of lever 267 which is on the opposite side of the pivoted mounting 269 is provided with a roller 273 which engages a cam 275 mounted on the cam shaft 28. A second tension spring 277 is secured at one end to lever 267 in such a manner as to bias the lever into engagement with both the movable blade 255 and the cam 275. The other end of spring 277 is fixed to the stub 265.

The springs 263 and 277 are proportioned so that the spring 277 supplies a greater moment to lever 267 than does spring 263 apply to lever 277 through portion 261 of movable arm 255.

When cam shaft 28 rotates in a clockwise direction the low cam portion 275A engages roller 273 and permits the lever 267 to pivot in a counter-clockwise direction under the urging of spring 277. This counter-clockwise movement of lever 267 will cause the movable scissors arm 255 to move from its solid line position to its dotted line position as viewed in FIG. 14 and thus snip off the film disposed between the two arms. Further rotation of the cam 275 will cause a pivoting movement of lever 267 in a clockwise direction and the spring 263 will cause the movable arm 255 to pivot in a counter-clockwise direction to maintain the scissor arm portion 261 in engagement with lever 267. This second pivotal movement will reopen the scissors and condition it to receive additional film between the scissor arms 253 and 255 for the subsequent cutting of a second frame.

The advancement of the film by the film feed mechanism locates a frame in the area of a photomount. However, the frame must be accurately positioned relative to the apertures in the photomount and advanced to the press and this is accomplished by device 6 (FIGS. 16 to 18). Device 6 comprises a movable index post 210, a presser plate assembly 212 and means for moving the post in a predetermined path to be described hereinafter. The means for moving the post is herein generally designated by the reference numeral 214. The post 210 is made out of relatively hard rubber or other yieldable material and has a top planar surface 216, a vertical side wall 218, a tapered side wall portion 220 and an adjoining vertical side wall portion 222, the two last named side wall portions being on the opposite side of post 210 from side wall 218. The peripheral extent of post 210 is smaller than the aperture 78 in mount 74 so that the post can extend therethrough. The post 210 is mounted on a vertically extending hollow pipe or shaft 224 which is slidably mounted in a fixture 226 for vertical movement. The interior of hollow shaft 224 is in communication with a small passage 228 in post 210 which passage 228 has communication with the outside of the post at its upper surface 216. Disposed around tube 224 and underneath fixture 226 is a compression spring 229 which abuts against the lower surface of fixture 226 at its upper end and abuts against a washer 231 at its lowest end. Washer 231 is disposed above a coupling 233 which coupling is adapted to be connected to a flexible hose 235 which is directly connected to the pump P. As pump P is a vacuum pump there is a constant negative pressure at the point of communication of the passage 228 with the atmosphere.

Index post 210 cooperates with presser plate assembly 212 and these two elements sandwich therebetween the film F which has been positioned therebetween by the film feed mechanism 8 described hereinbefore. The presser plate comprises a generally rectangular plate 230 which is formed integrally with an arm 232 which is vertically offset from the plate 230. Extending transversely through arm 232 is a cylindrical bolt 234 which is fixed to the arm 232. Bolt 234 is disposed within a cylindrical cavity 237 in member 122 at the left hand end thereof as viewed in FIG. 9. The right hand end of the bolt 234 abuts against a compression spring 236 which is disposed within the cavity 237, the spring 236 abutting against the right hand end of the cavity at its opposite end from bolt 234. Thus spring 236 biases bolt 234 and arm 232 and presser plate 230 to the left as viewed in FIG. 9. Fixed to bolt 234 is a pin 238 having a nob 240 secured to its free end. Pin 238 is disposed in and extends through a bayonette slot 241 in member 122. Normally presser plate 230 is disposed in a horizontal position parallel to and above the upper surface 216 of post 210. However, when access is desired to be gained between the presser plate and the post the machine operator can grasp nob 240 and push it to the right against the bias spring 236 and thereafter pivot bolt 234 in cavity 237 to swing the presser plate up into a substantially vertical plane. When it is desired to restore the presser plate to its normal horizontal position nob 240 is moved so as to pivot bolt 234 in a clockwise direction as viewed in FIG. 10 until the pin abuts against the end of the bayonette slot and thereafter spring 236 will move the pin and bolt assembly to the left and thus force the pin into the longitudinally extending part of the bayonette slot to hold the entire assembly in the normal position.

As was stated hereinbefore the post 210 acts to accurately index the film or transparency in the transparency mount. This is done by moving the presser 210 upwardly through the aperture in the photomount 74 which is disposed in a horizontal plane so that the upper surface 216 of the post will abut against the film which is disposed between it and the presser plate 230 and move the film upwardly against the presser plate so as to bring about a seal between the upper surface 216 and the film F. This seal is effected by the constant negative pressure at the outlet 228 of tube 224 which causes a vacuum to hold the film. With the film grasped in the above described manner the particular transparency is cut away from the roll by a suitable cutting means to be described hereinafter and thus is separated from the roll. Thereafter the post 210 moves downwardly a short distance and then moves to the right as viewed in FIG. 16 and in a slightly downward direction to slide the film F and the photomount 74 along support surface 16 out from under the presser plate 230 and towards the heated press 4 which acts to seal the photomount in a manner to be described hereinafter. At the completion of the downward movement of post 210, the frame of film F will be accurately positioned in surface-to-surface relation with the horizontal portion of the photomount and in between the embossments 152.

To effect the movement of the post 210 as described above 2 cams 242 and 244 are employed. Both cams are mounted on cam shaft 28. As will be explained immediately below the cam 242 acts to move the post 210 up and down in the vertical direction whereas cam 244 together with associated linkage acts to move post 210 in a horizontal direction. As stated above tube 224 is slidably mounted in fixture 226 to permit up and down movement of post 210. Fixture 226 is made of two vertically spaced horizontal arms 246 and 248 which extend laterally from a main body portion 250. Main body portion 250 is provided with a central aperture 252 through which extends a circular shaft 254. Thus main body portion 250 is slidably mounted on a shaft 254 which is fixedly secured to a supporting structure 256 which in turn is fixed to the base 257 of machine 1. Extending between the supporting structure 256 and main body portion 250 of fixture 226 is a tension spring 258 which biases the fixture 226 to the right as viewed in FIGS. 16 and 18. Mounted on one of the sides of the main body portion 250 of fixture 226 is a roller 260 which engages a lever 262 which is pivotally mounted on the base 257 as at the pivot point 264. Lever 262 is biased toward roller 260 by a tension spring 266 which is secured at one end to the frame of the machine and is secured at its other end to lever 262. Lever 262 is thus biased to the left as viewed in FIG. 15 and into engagement with cam 244. When cam shaft 28 rotates to thus rotate cam 244 it will be seen that the cam 244 is shaped so as to move the lever 262 in an oscillating movement first to the right and then to the left as viewed in FIG. 15. As lever 262 swings to the right under the urging of cam 244 spring 258 will be effective for moving fixture 226 to the right and thus to move post 210 to the right and when the cam 244 permits lever 262 to move to the left spring 266 will move lever 262 to the left and thus cause the lever to move fixture 226 to the left against the urging of spring 258. Hence, post 210 will move to the left. Thus it will be seen that spring 266 must have a greater tension than spring 258.

Formed on coupling 233 is a cam follower 270 which is spring biased by spring 229 into engagement with cam 242. As cam 242 has high portions and low portions it will be seen that it will cause the cam follower to move up and down and thus move the post 210 up and down. Cams 242 and 244 are so shaped that post 210 will follow a path of movement substantially as shown in FIG. 19. Referring now to FIG. 19 and assuming position 272 is the starting position for post 210 when the post is in position 272 it extends through the aperture in the photomount 74 which is disposed in the plane of supporting surface 16 and extends above that plane to force the film F against presser plate 230. In position 272 a seal is effected between the post and the film so as to lock them by means of the vacuum being drawn on the post. As the cam shaft 28 rotates post 210 will first drop a short distance to move film F out of engagement with the presser plate 230. Thereafter the post will commence moving to the right and simultaneously downward for a short time so as to bring the transparency into engagement with the photomount and to move the photomount and transparency to the right towards the press 4. Thereafter, the downward movement of post 210 will stop but the post will continue moving to the right as viewed in FIG. 16 until it reaches its rightmost position. At this point post 210 will drop straight downward a short distance to position 276 below surface 16 to break the vacuum seal with the film and to dispose the film and photomount on surface 16 where it will be subsequently picked up by the press shuttle as will be described hereinafter. Post 210 will then move in a horizontal direction to the left to position 278. At position 278 the post 210 will again be raised to again resume position 272 and thus engage the next transparency which has been fed by the film feed mechanism described hereinbefore.

During the rightward movement of the post 210 the folding of the half folded transparency mount is completed by a folding member 265 shown in FIGS. 8 and 8A. Member 265 is formed integrally with member 156 and is provided with two upstanding side walls 267 which are secured to the base 16 in spaced apart relation on opposite sides of the slot 271 through which the post 210 moves. The forward portion 273 of the top wall 275 of member 265 is downwardly inclined and the rear portion 277 of top wall 275 is parallel to the surface 16 and spaced therefrom to define a mount receiving passage 279. As the post 210 moves through the slot 271 from left to right as described above the upstanding portion of the photomount 74 will abut against the front surface 281 of top wall 275. Continued movement of the post 210 will cause the upstanding portion to be folded so that it can fit into the member 265 in the tapered chamber portion 283 thereof, to complete the folding of the photomount started by folding member 156. When the post 210 reaches its position 274 and moves downwardly to position 276 to break the seal with frame F, the folded photomount is disposed in chamber portion 279 and is held therein in folded relation by the top wall portion 277 and the supporting surface 16. Thus, the folding of the photomount is completed by a second stationary member, namely folding member 265 and the mount is conditioned for hot pressing by press 4.

It will be seen that the post 210 moves the film and photomount at right angles to the path that the dogs 114 move the photomount toward the press. This changing of direction of movement aids in completing the folding of the photomount and brings the folded photomount with properly indexed film toward the press which heat seals the photomount with the film properly indexed therewithin. The press is generally designated by the reference numeral 4 and is illustrated in FIGS. 20 and 21.

Press 4 includes a stationary lower platen 280, a vertically movable upper platen 282, and means for moving said upper platen relative to the lower platen. This moving means comprises a toggle 284, the details of which will be described hereinafter. The lower platen is provided with four electrical heating elements which are embedded in a solid block of metal to uniformly heat the platen. These heater elements are designated by the reference numerals H1 to H4 and are diagrammatically shown in FIG. 24. To protect the film F from excessive heating, the lower platen 280 is provided with two milled out portions which are adapted to register with the film and thus bring about a spacing between the film and the heated lower platen 280 with the photomount itself in direct abuting relation with said platen during the pressing operation as will be described subsequently. The upper platen is provided with a slot 283 in which are disposed two pressing plates 285 and 287. Plates 285 and 287 are each fixed to vertically extending rods 289, which are secured to the top of the platen as by castellated nuts 291. The rods 289 extend through apertures in platen 282 which apertures have lower wide portions 293 and upper narrow portions 295, the latter of which permit the rods to pass through with some clearance. Surrounding the rods 289 and disposed in the wide portions 293 of the apertures for said rods are compression springs 297 and 299, respectively, which bias the movable plates toward the lower platen. However, this bias is limited by the rods 289 so as to provide adequate clearance for the movement of the mount and shuttle as it passes through the press in the manner to be described hereinafter. Each of the plates 285 and 287 is provided with milled out portion which is adapted to register with the milled out portions in the lower platen in order to protect the film against excessive heating. The reason for the two spring pressed plates in the upper platen 282 will become clear as this description proceeds.

The stationary lower platen 280 is mounted on a supporting structure 286. Supporting structure 286 is provided with two bearings 288 for a shaft 290 on which the upper arm 292 of toggle 284 is mounted. The upper arm 292 of toggle 284 is pivotally connected to a lower arm 294 of the toggle as by a pin 296. The lower end of arm 294 is pivotally secured to a fixture 298 as by a pin 300. Fixture 298 is fixed to a pair of vertically extending shafts 302 as by nuts 304 and the shafts 302 slidably extend through the stationary platen 280 and are fixed to the movable platen 282 in any suitable manner as by a threaded connection. Journaled in bearings 306 on structure 286 is a horizontal press shaft 308. Shaft 308 has mounted thereon a spur gear 309 which may be driven by any suitable means such as the output motor 30. It will be noted that press shaft 308 is not connected to cam shaft 28 but is driven directly and independently by the motor M. The reason for this will become apparent as this description progresses. Fixed to press shaft 308 is an eccentric cam 310 which engages the center of the toggle 284 in the vicinity of pin 296. The weight of the movable platen 282 the vertical shaft 302 and the fixture 298 biases the toggle arms 292 and 294 to an aligned position, that is a position in which the press will be closed and the platens 282 and 280 will be in close confronting relation. However, the cam 310 is shaped so as to periodically force the center of the toggle out of alignment with the two pivoted points thereof and thus tend to move the fixture 298 upwardly to thus force the movable platen 282 upwardly away from the platen 280 and thus open the press. Therefore, it will be seen that as the cam 310 rotates in response to the rotation of the shaft 308 the press will open and close in a periodic fashion.

As will be described hereinafter, the press 4 is arranged to simultaneously press two photomounts. Further, as will be described hereinafter, by means of a shuttle assembly 312, each photomount will be subjected to two pressing operations. The shuttle assembly includes a pair of horizontally spaced longitudinally extending members 314 and 316 which are connected by means of transverse pins 318. The members 314 and 316 extend through the press 4 in a slot 319 in stationary platen 280. The members 314 and 316 each are provided with a plurality of upstanding tips 324 which are adapted to engage the rear edge of each photomount disposed in chamber portion 279 of folding member 265 and move it under the press in a manner to be described hereinafter. The tips are spaced apart a distance just slightly greater than the longitudinal extent of a folded photomount. Connected to each member 314 and 316 of press shuttle 312 and forward of the press 4 is an arm 326 which is connected at its other end to a fixture 328 which is fixedly mounted on a horizontal shaft 330. Shaft 330 is slidably mounted in a bracket 332 which is clamped to one of the vertically extending shafts 302 that cause the movable platen 282 to move up and down in response to the folding and collapse of the toggle 284. Thus as the press opens and closes in response to the movement of the toggle, the shuttle 312 will move up and down. The parts are so positioned and proportioned that when the press is closed the upper edges of the tips 324 are disposed below the surface of the stationary platen 280 in the slot 318, and when the press is open the tips 324 will extend above the surface of the stationary platen 280 and the surface 16 so as to effectively engage the edges of photomounts disposed on surface 16 by post 210 and disposed within the press to be able to advance them horizontally in the manner to be described hereinafter. It will be obvious that in order for the press shuttle to move upwardly to engage a folded photomount in chamber portion 279 of folding member 265, the lower planar surface of upper wall 277 must be provided with spaced longitudinally extending grooves 263 to permit clearance for tips 324 during the return stroke of the press shuttle in its raised position.

Mounted on the press shaft 308 is a cam 340 of eccentric peripheral configuration. Pivotally connected at the base of the support structure 286 is a lever 342 having mounted on the central portion thereof a roller 344. The upper end of lever 342 is in engagement with a roller 346 which is rotatably mounted on the fixture 328. Also connected to fixture 328 by means of a pin 348 is a tension spring 350 which is connected at its other end to a stud 352 fixed to the supporting structure 286. Thus it will be seen that the spring 350 biases the shuttle assembly 312 to the left as viewed in FIG. 21 and hence biases the roller 346 into engagement with the lever 342. Further, the biasing of the roller 346 into engagement with lever 342 biases the roller 344 mounted on the lever 342 into engagement with the eccentric cam 340. Cam 340 is so shaped that it oscillates the lever 342 to and from the two positions shown in FIG. 21 whereby to oscillate the shuttle assembly back and forth a distance equal approximately to the distance between two adjacent pins 324.

As the cams 310 and 340 are mounted on the same cam shaft they may be timed to give a square motion to the shuttle assembly 312. Starting with the press closed but about to be opened the shuttle arms 314 and 316 will be in their left hand (dotted line position) as viewed in FIG. 21 and be in their lower position. As the press opens the shuttle assembly 312 will move upwardly with the upper platen 282 and engage a photomount and film which at the time is resting in chamber portion 279 of folding member 265 where it was deposited by post 210 as was described earlier in this specification.

Thereafter the cam 340 will pivot the lever arm 342 to the right to move the shuttle assembly 312 to the right and thus move the photomount into the left hand press position 354 in which position the shuttle assembly will be in the solid line position as shown in FIG. 20. The rightward movement of the shuttle will move the mount between the fixed and movable platens of press 4. Thereafter the cam 310 will permit the toggle arms 292 and 294 to move into alignment and thus close the press by moving the movable platen 282 downward towards the fixed platen 280. This downward movement of platen 282 will impart a downward movement to shuttle assembly 312 and thus cause the shuttle arms 314 and 316 to move into their associated slots to leave the photomount on the lower platen for pressing. At the time of the initial pressing of the photomount in position 354 it will be noted that there is no photomount in position 356 which is the right hand pressing position for the press 4. Since as has just been described it is clearly a necessity from time to time that there be only one photomount in the press 4 and hence only one press position being occupied, the movable plates 285 and 287 in the upper platen 282 have been provided. These plates permit for a square pressing of the photomount and prevent the movable platen from becoming angularly related during the pressing with respect to the fixed platen. Thus the spring biased plates in the upper platen are adapted to compensate for the lack of a photomount in one of the two pressing positions when this circumstance arises. It will be obvious that this circumstance will normally arise only at the beginning and at the end of a run of the machine. During the time that the photomount is being heat sealed in the press position 354 the shuttle assembly 312 is being moved to the left to restore it to its initial dotted position where it will engage a second photomount in the manner that the first was engaged. At the same time the tip 324A will be moved into a position where it will be behind the trailing edge of the photomount in the position 354 so that when the press is opened it will move up to engage the first described photomount and move it into the second press position 356 while the second photomount is being moved to the press position 354. When the press closes a second time the first mentioned photomount will be subjected to a second heat sealing operation and the second photomount will be subjected to its first heat sealing operation. Subsequent operations of the shuttle will advance each of the photomounts to the right as viewed in FIG. 21 until the photomount is pushed by the leading edge 357 of the shuttle arms 314 and 316 into the chute 358 to carry the photomounts to a suitable receptacle.

It will be noted from the foregoing that each photomount is subjected to two pressing operations. This is a desirable feature of the present invention as due to the temperature limitations placed on the press by the film and paper the time for actually effecting a permanent seal between the two folded portions of the photomount is excessively long and will therefore greatly slow down the operation of the machine if the press were held in pressing relation during one pressing operation for a sufficiently long time to effect a complete seal. Accordingly, to speed up the operation, I have divided the pressing time into two equal pressing portions and thus have doubled the speed of operation of the machine.

It will be noted from the above description that many of the operations described hereinbefore are controlled by cams operating off the cam shaft 28 and cam shaft 308. While the shapes of some of the cams have been illustrated, for the sake of clarity and simplicity others have not. However, the timing of the operations of the various components is illustrated in FIG. 23 and any person skilled in the art can determine the shape and relative positions of the cams from this diagram. Cam shaft 28 is driven by a sprocket 360 through an electric clutch 362 which operates in connection with an electric brake 364. The clutch 362 is effective for connecting the sprocket 360 to the cam shaft 28 to rotate the cam shaft and the brake is effective when energized to lock the cam shaft in its stopped position.

Other apparatus for controlling the timing of my machine is electrical and the electrical apparatus is diagrammatically illustrated in FIG. 24 of the drawings.

The electrical control apparatus includes a main control power switch which controls the supply of electrical energy to the entire machine. This switch is designated by the reference character PS, and feeds two supply lines 380 and 382. The lines 380 and 382 are preferably both fused by fuses F. Included in the electrical control apparatus is a normally closed manually operable starting switch SS. Also included is a presser plate switch PPS which is controlled by the movement of the presser plate 230 into and out of its normal position. The presser plate switch PPS is closed when the presser plate is out of its normal operating position and the switch PPS is open when the presser plate 230 is moved into its normal or proper horizontal operating position. The start switch SS and the presser plate switch PPS control a relay R1. The energizing circuit for the relay may be traced from supply line 380 over start switch SS and presser plate switch PPS in multiple, through the winding of relay R1 to line 382.

A second relay R2 is also included in the control apparatus shown in FIG. 24. This relay is provided with three energizing circuits. The first of these energizing circuits may be traced from line 380, over front contact a of relay R1, through a post stop switch PSS and the winding of relay R2 to line 382. The second energizing circuit for relay R2 may be traced from line 380, through a post timing switch PTS, over front contact a of a mount start button MSB, through a mount feed interlock switch MF1, through switch PSS and the winding of relay R2 to the line 382. Post stop switch PSS is a switch operated by a pin 402 fixedly mounted on cam shaft 28 and is normally open but closes when cam shaft 28 reaches a predetermined position known as the starting position. The post timing switch PTS is a switch which is operated by a pin 386 which is fixed to the shaft 308 for the press 4. The function of the post timing switch PTS is to assure that the shuttle 312 operates in proper timed relation with the post 210. It will be remembered in this connection that the press operates independently of the cam shaft 28 and it is the function of the post timing switch to have these two independent portions of the apparatus operate in proper timed relation. Post timing switch PTS is normally closed but opens when the button 386 engages the switch. At this point the shuttle 312 and the post 210 are in proper timed relation. The master start button MSB is a manually operated normally closed push button switch. The mount feed interlock MF1 functions to assure that no film will be fed by the film feed apparatus 8 unless a photomount is properly positioned to receive that film. This is accomplished by having the mount feed interlock switch operated by a photomount itself. The mount feed interlock switch has its actuating member extending up into the path of movement of the photomounts as they are fed by dogs 114 into the position where the post can move through one of the apertures therein and when the photomount is in position to receive the post and film the mount feed interlock switch is open. At other times the mount feed interlock switch MF1 will be closed. The film feed clutch 184 and the cam shaft clutch 362 and the cam shaft brake 364 are all energized by direct current supplied from a rectifier K having two output lines 388 and 390. Rectifier K is energized by lines 380 and 382 through a current limiting resistor CR1. The energizing circuit for the film feed clutch 184 may be traced from line 388, over normally closed contact b of mount start button MSB, the winding of clutch 184 and through switch CSS to line 390. The cam shaft clutch 362 is energized over a circuit which may be traced from line 388, through the winding of cam shaft clutch 362 over a manually operated clutch switch CS, over back contact $b$ of relay R2 and through a current limiting resistor CR2 to line 390. Clutch switch CS is a toggle switch and is normally closed during operation of the machine. The brake 364 is energized by a circuit which may be traced from line 388, through the winding of brake 364 over front contact $c$ of relay R2 and through the current limiting resistor CR2 to line 390. It will thus be seen that with the clutch switch CS closed the clutch 362 is energized when relay R2 is deenergized and at that time the brake 364 is also deenergized to permit movement of cam shaft 28. When the clutch 362 is deenergized the brake 364 is energized to prevent rotation of the cam shaft 28. The inclusion of the clutch switch CS is for the purpose of permitting the clutch to be deenergized at the same time the brake is deenergized so as to permit manual rotation of the cam shaft 28 by the manual rotation of the handle 392 mounted on the end of the cam shaft 28.

As stated earlier lower platen 280 of press 4 has embedded therein four electrical heating elements H1, H2, H3 and H4. These heating elements are energized by the main supply controlled by the power switch PS. Three of the heating elements, H1, H2 and H3 are controlled by a thermostatic element T2 which is closed when the temperature of the platen is below a predetermined value and is open when the temperature is above said value whereby to regulate the temperature of the platen within a close predetermined range. The fourth heating element H4 is directly connected across the lines 380 and 282 and is therefore continuously energized when the main power switch PS is closed. Also associated with the heating elements is a temperature indication lamp L1, which is energized by a circuit which may be traced from the line 380 through a thermostatically controlled contact T1 through the lamp L1 to the line 382. Thermostatic element T1 is substantially identical to thermostat T2 and, accordingly, is closed when element T2 is closed and is open when element T2 is open. Therefore, when press platen 280 is up to temperature the light L1 will be out. The machine is also provided with two electric motors, one of which is connected to pump P to drive said pump and the other of which is connected to cam shaft 28 and press shaft 308 to drive these two shafts. The pump motor is designated by the reference character PM and, as previously stated, the main motor is designated by the reference character 30. Both of these motors are energized in multiple through a master switch MS which is a manually operated switch which is closed when the device is operating.

Assuming that there are no photomounts disposed within the machine, when the main power switch PS is closed and the main drive switch MS is closed the pump motor PM and the main drive motor 30 will become energized. Furthermore, relay R1 will be energized as start switch SS is closed to energize relay R1 although presser plate switch PPS is open as the presser plate 230 will be assumed to be in its proper position parallel to the post 210. As will be understood hereinafter at the time of the starting up of the machine the post stop switch PSS will also be closed as the machine will always stop in a position to cause said switch to be closed. The post timing switch PTS wil be opening and closing at this time as the press shaft 308 is being continuously rotated by the motor 30. The mount start button MSB is at this time closed and the mount feed interlock switch MF1 is also closed as there is no mount engaging the switch to open it. Accordingly, it will be seen that at this time relay R2 will be energized over its previously traced energizing circuits including front contact $a$ of relay R1 and post stop switch PSS, as well as over its previously traced energizing circuit including contact $a$ of mount start button MSB and the mount feed interlock switch MF1. Further, as shaft 306 is constantly rotating the post timing switch PTS is periodically opening and closing to establish and open the remaining energizing circuit for relay R2 including front contact $a$ of relay R2. In the normal stopping position of the cam shaft the switch CSS will be open and accordingly the film feed clutch 184 is deenergized. Furthermore, with relay R2 energized it will be seen that the cam shaft clutch 362 is deenergized at back contact $b$ of relay R2 which is presently open and cam shaft brake 364 is energized over front contact $c$ of relay R2 which is closed to thereby hold the cam shaft in a fixed position. At this point it is imperative to note that the machine will not operate merely by depressing the start switch SS, for to do so would cause the apparatus to commence feeding film while there was no mount positioned to accept the film. This is prevented by the inclusion of mount feed interlock switch MF1.

Accordingly, the first step the operator must take is to simultaneously depress the start switch SS and the mount start button MSB. By depressing the start switch SS, the sole remaining energizing circuit for relay R1 becomes open and relay R1 releases to open its front contact $a$. Accordingly, the energizing circuit for relay R2 including front contact $a$ of relay R1 becomes open. Furthermore, with the mount start button MSB depressed, contact $a$ of button MSB becomes open to open the energizing circuit for relay R2 including said contact. When shaft 306 rotates to the point where pin 386 engages post timing switch PTS the post timing switch opens to open the remaining energizing circuit for relay R2 and thereby cause relay R2 to release. It will be noted that relay R2 cannot release until the post timing switch PTS is open and this is the means by which synchronization of the movements of the post 210 and press shuttle 312 is achieved. With relay R2 released the cam clutch 362 becomes energized and the cam brake 364 becomes deenergized whereby to cause the cam shaft 28 to rotate. Rotation of the cam shaft will cause the stack separating device to separate a photomount from the stack and the chain 98 will advance the photomount toward the post 210. The press shuttle and press at this time are also working as is the post moving through its path of movement as shown in FIG. 18. However, the film feed mechanism 8 is not feeding film at this time as with the mount start button MSB depressed the film feed clutch 184 will be deenergized and hence there will be no rotation of the sprocket 162. This prevents the film from being fed before there is a photomount present to receive it. After the operation has been instituted by a simultaneous depression of switches SS and MSB both these switches can be permitted to return to their normal closed position but this will have no immediate effect on the apparatus. The reclosing of switch SS will cause relay R2 to pick up and close its front contact $a$. However, the closing of front contact $a$ of relay R1 will not reestablish the energizing circuit for relay R2 containing said contact $a$ as the post stop switch will be open at this time as the machine has not completed a full cycle and returned to its starting position. With the post stop switch open it is obvious that none of the energizing circuits of relay R2 can be established and accordingly relay R2 will remain deenergized to cause the energization of the clutch 362 and the deenergization of the brake 364 to thereby permit the continued rotation of the cam shaft 28. The film feed clutch 184 will not be open as the cam 400 mounted on cam shaft 28 which engages the switch SS to operate it will be in a position relative to the switch whereby the switch will be open. As the photomount moves down under the hold down mechanism 120 and approaches the post 210 it will engage the mount feed interlock switch to open switch MF1. However, the cam shaft will not stop until button 402 on cam shaft 28 engages post stop switch PSS to close that switch and thus cause relay R2 to energize. As was stated hereinbefore this will occur when the cam shaft is rotated back to its normal starting position to assure that the feeding of photomounts will be in proper sequence during the operations of the entire device.

From the foregoing it will be seen that with no photomount engaging the mount feed interlock MF1 it is impossible to cause the cam shaft 28 to rotate if the mount start button MSB were not included in the energizing circuit for relay R2 which also includes switch MF1. The mount start button thus manually overrides the switch MF1 and permits the operation of the machine when no photomount is in position to receive film in order to so position a photomount.

Once a photomount is positioned above the post 210, the machine 1 is thereafter operated by merely depressing the starting switch SS. The operation of the machine will be as follows. Upon the depression of the starting switch SS, the relay R1 will release and thereby open its front contact a. This will open one of the energizing circuits for relay R2. The energizing circuit for relay R2 including the mount feed interlock switch MF1 will also be opened due to the contact between the switch MF1 and the properly positioned photomount. Upon the press shaft 308 rotating to cause pin 386 to engage and open the post timing switch PTS, the third energizing circuit for relay R2 will become open and relay R2 will release to open its front contacts a and c and close its back contact b. It will be noted therefore that the relay R2 will release at a predetermined time in the cycle of the operation of the press shuttle 312 to thereby insure that the press shuttle and press operate in timed relation with the rotation of the cam shaft 28. When relay R2 releases cam clutch 362 will become energized (the cam switch CS having been closed at the same time as the power switch PS was closed) and the cam shaft brake 364 will become deenergized to permit rotation of the cam shaft. Furthermore, at the initial position of the cam shaft cam shaft switch CSS will be closed to thereby energize film feed clutch 184 so that the film feed sprocket 162 will rotate in response to rotation of the cam shaft. The initial rotation of the cam shaft will cause rack 182 to move so as to rotate sprocket 162 and advance one frame of film on the roll of film being supplied by the film feed mechanism 8. At the same time index post 210 will move a short distance to the left to register with the aperture in the mount ready to receive film and will then move upwardly to reach its position 272 after the film feed sprocket 162 stops feeding. As the index post 210 reaches position 272 it will compress the film between the index post and the presser plate 230 and will hold it there while the film cutter cuts off the frame at its proper index position. Further, the vacuum being drawn by the pump through the index post will cause the film to be sealed against the upper surface of the index post 210. Thereafter the index post 210 will move downwardly and to the right as viewed in FIG. 15 to index the transparency in the mount and to move the mount under folding member 265 to complete the folding operation. At the time the index post reaches its extreme right hand position 274 the press shuttle 312 will be moving toward its extreme left hand position. At position 274 under folding member 265 index post 210 will move downwardly to its position 276 to break its seal with the photomount and to deposit the mount in a position on surface 16 where press shuttle 312 will subsequently pick it up. The press shuttle will continue moving to its left hand position as the post 210 commences moving left and when the shuttle reaches its extreme left hand position the press will open and the shuttle will move up to pick up the mount. The press shuttle will then commence moving to the right to its solid line position to move the folded mount to press position 274. As the press shuttle reaches its right hand or solid line position shown in FIG. 20 it will commence moving downwardly a short distance together with the downward movement of the platen 282. The downward movement of the shuttle will cause the photomount to rest against the lower platen 280 and will also bring the upper platen 282 into compression engaging relation with the photomount. As the lower platen is heated the compression of the photomount will cause the heat sensitive adhesive to bond together and thus commence the bonding of the two halves of the photomount. During this compression of the photomount in position 354 of the press the shuttle 312 will move back to the left for an engagement of the next photomount which is being processed by the machine. As the movable platen 282 moves upwardly the press shuttle 312 will also move upwardly so as to engage the photomount in position 254 and also to engage the next subsequent photomount being processed. Thereafter the shuttle 312 will again move to the right to advance the first mentioned photomount from position 354 to position 356 and to advance the second mentioned photomount into position 354. Upon the shuttle moving the two photomounts into the aforedescribed positions the shuttle will again move downwardly and along with the movable platen 282 to cause a second pressing of the first mentioned photomount and a first pressing of the second mentioned photomount. The second pressing of the photomounts assures a firm and long lasting seal of the photomount. Subsequent operations of the press will continue to advance the photomounts to the right as viewed in FIG. 20 until finally the photomount is pushed along the supporting surface 16 of the machine into the chute 358 which will convey the finished photomounts to a waiting receptacle. Naturally, during the above described operations, the stack separating device 10 is separating one mount per revolution of cam shaft 28 and a dog 114 is engaging the separated photomount and moving it past the mount hold down mechanism into position to receive a frame of film, and the film feed mechanism will feed a frame of film to the properly positioned photomounts, once per revolution of cam shaft 28.

It should be noted that as long as the start button SS is depressed the machine will continue to feed photomounts as hereinbefore described. However, upon releasing the start switch SS the cam shaft will rotate until it gets to its predetermined stopping position at which point the relays R1 and R2 will be picked up to deenergize the cam shaft clutch 362 and to energize the cam shaft brake 364 and thus stop the cam shaft from further rotation. However, as long as the master switch MS is energized the press will continue to operate and thereby insure that any photomounts in process by the press will have their processing completed and will be deposited into the waiting receptacle and not be left in the machine where they might be spoiled.

It will be obvious from the above description that several of the steps of the operation described above occur concurrently as more than one photomount is being processed at a time. It should be particularly noted that, in accordance with the design of my machine and as is clearly shown in the timing diagram (FIG. 23), at all times each portion of the machine is processing a different photomount. That is, photomounts are being separated from the stack at the same time as a photomount is being advanced towards the index post and at the same time the index post is processing a frame of film which is simultaneously being cut by the cutting means and at the same time the shuttle is advancing a number of photomounts past the press for heat sealing and subsequent disposition into the chute.

This application is a division of my earlier filed parent application Serial Number 775,412, filed by me on November 21, 1958, now Patent No. 3,067,805, and assigned to the assignee hereof.

While I have herein shown and described one form of the present invention and have suggested several modifications therein it will be understood that various changes and modifications may be made therein within the scope of the appended claims without departing from the spirit and scope of the present invention.

What I claim is:

1. In a machine for automatically mounting transparencies in transparency mounts, each of said transparencies being a frame on a roll of film having a perforated edge; means for feeding said film to said machine one frame at a time, comprising a sprocket having teeth adapted to engage said film perforations, a first rotatable shaft for driving said sprocket; and means for intermittently rotating said first shaft comprising a second shaft in axial alignment with said first shaft, means for oscillating said second shaft back and forth, clutch means connecting said second shaft to said first shaft for imparting rotary movement to said first shaft when said second shaft oscillates in one direction and for preventing rotary movement of said first shaft when said second shaft oscillates in the opposite direction, the parts being proportioned so as to rotate said sprocket when said first shaft rotates in said one direction an angular distance equal to the length of one of said frames; means for indexing said sprocket prior to each rotation thereof, cutting means for cutting each of said frames from said roll of film, and means for operating said cutting means after each time said sprocket stops rotating.

2. In a machine for automatically mounting transparencies in transparency mounts, each of said transparencies being a frame on a roll of film having a perforated edge; means for feeding said film to said machine one frame at a time, comprising a sprocket having teeth adapted to engage said film perforations, a first rotatable shaft for driving said sprocket; and means for intermittently rotating said first shaft comprising a second shaft in axial alignment with said first shaft, means for oscillating said second shaft back and forth comprising a pinion fixed to said second shaft and a rack in meshed relation with said pinion, a rotating cam shaft, a cam fixed to said cam shaft, an elongated cam follower pivoted at one end and operatively connected at the other end to said rack, said cam follower operatively riding on the periphery of said cam intermediate its two ends, said cam being so shaped as to impart an oscillating motion to said cam follower as said cam rotates, whereby to impart a reciprocating motion to said rack, said reciprocating motion of said rack imparting said oscillating motion to said second shaft, clutch means connecting the confronting ends of said first and second shafts for imparting rotary movement to said first shaft when said second shaft oscillates in one direction and for preventing rotary movement of said first shaft when said second shaft oscillates in the opposite direction, the parts being proportioned so as to rotate said sprocket when said first shaft rotates in said one direction an angular distance equal to the length of one of said frames; means for indexing said sprocket prior to each rotation thereof, comprising a locking dog and an indexing slot carried by said second shaft and adapted to slidably receive said locking dog, a second cam follower, said locking dog being carried by said second cam follower, a second rotating cam fixed to said cam shaft, said second cam follower riding on said second cam and being movable thereby so that said locking dog moves into said indexing slot once prior to each rotation of said first shaft; cutting means for cutting each of said frames from said roll of film, and a third cam means fixed to said cam shaft for operating said cutting means after each time said sprocket stops rotating.

References Cited by the Examiner

UNITED STATES PATENTS

| | | | |
|---|---|---|---|
| 1,907,760 | 5/33 | Egger | 83—273 |
| 2,788,104 | 4/57 | Mason | 192—84 |
| 2,809,735 | 10/57 | Hand | 192—84 |
| 2,860,703 | 11/58 | O'Donnell | 83—231 |
| 2,861,633 | 11/58 | Schneider | 83—231 |
| 2,911,905 | 11/59 | Marvin | 83—278 |

ANDREW R. JUHASZ, *Primary Examiner.*